United States Patent
Krishnamurthy et al.

(10) Patent No.: US 6,389,464 B1
(45) Date of Patent: May 14, 2002

(54) DEVICE MANAGEMENT SYSTEM FOR MANAGING STANDARDS-COMPLIANT AND NON-COMPLIANT NETWORK ELEMENTS USING STANDARD MANAGEMENT PROTOCOLS AND A UNIVERSAL SITE SERVER WHICH IS CONFIGURABLE FROM REMOTE LOCATIONS VIA INTERNET BROWSER TECHNOLOGY

(75) Inventors: Srini Krishnamurthy, Rockville, MD (US); Sunil Sharad Mehta, Springfield, VA (US); Cary Bailey O'Brien, Washington, DC (US)

(73) Assignee: Cornet Technology, Inc., Springfield, VA (US)

( * ) Notice: Subject to any disclaimer, the term of this patent is extended or adjusted under 35 U.S.C. 154(b) by 0 days.

(21) Appl. No.: 08/884,468

(22) Filed: Jun. 27, 1997

(51) Int. Cl.⁷ ........................ G06F 15/177; G06F 15/173
(52) U.S. Cl. ........................ 709/220; 709/221; 709/223; 710/104; 710/8
(58) Field of Search ........................ 709/202, 203, 709/208, 218, 200, 223, 224, 226, 249; 713/100; 710/10, 8

(56) References Cited

U.S. PATENT DOCUMENTS

| | | | |
|---|---|---|---|
| 3,794,982 A | * 2/1974 | McCormick et al. | 235/435 |
| 4,754,395 A | 6/1988 | Weisskaar et al. | 364/200 |
| 4,780,821 A | 10/1988 | Crassby | 364/200 |
| 4,882,674 A | 11/1989 | Quint et al. | 364/200 |
| 4,901,231 A | 2/1990 | Bishop et al. | 364/200 |
| 4,914,583 A | 4/1990 | Weisskaar et al. | 364/200 |
| 5,051,720 A | 9/1991 | Kittrautsunetorn | 340/310 |
| 5,261,044 A | 11/1993 | Deo et al. | 395/159 |
| 5,345,586 A | 9/1994 | Hamala et al. | 395/650 |
| 5,353,399 A | 10/1994 | Kuwamoto et al. | 395/159 |
| 5,442,791 A | 8/1995 | Wrabetz et al. | 395/650 |
| 5,495,607 A | 2/1996 | Pisello et al. | 395/600 |

(List continued on next page.)

FOREIGN PATENT DOCUMENTS

WO  WO-97/05703  * 2/1997

OTHER PUBLICATIONS

Worldwide Web Home Page for Cyberhouse™ Electronic House Smart Home, Downloaded May 6, 1997; http://www.smarthome.com/smarthome11250.html, pp. 1–4.

(List continued on next page.)

Primary Examiner—Mark H. Rinehart
Assistant Examiner—Beatriz Prieto
(74) Attorney, Agent, or Firm—Roylance, Abrams, Berdo & Goodman, L.L.P.

(57) ABSTRACT

A site server is provided to which devices to be managed are connected. The site server is configurable from remote locations using Internet browser technology. The site server ports can be -configured as serial ports, contact closure ports and analog ports. Users from remote locations can communicate with the site server via direct dial through a public switch telephone network, as well as Internet and intranet connections. In addition to a modem and a 10-BaseT Ethernet interface, the site server is provided with a manager agent, a MIB or similar data structure of managed objects and/or variables, a Web server, a SQL database engine, TCP/IP routing software, PPP communications support, device-translation drivers and a multi-tasking Device Management Operating System to allow the site server to map native device interfaces into operations to communicate with a manager. The site server is Web-configurable to manage different types of devices without requiring device-specific software development. Alarm events, alert monitoring, remote monitoring and remote trouble-shooting are Web-enabled. Device information can be accessed globally via a Web or Internet browser. The site server can deliver device information via facsimile, paging, electronic mail and management traps.

35 Claims, 29 Drawing Sheets

U.S. PATENT DOCUMENTS

| | | | | |
|---|---|---|---|---|
| 5,517,622 A | * | 5/1996 | Ivanoff et al. | 709/232 |
| 5,530,852 A | | 6/1996 | Meske, Jr. et al. | 395/600 |
| 5,537,546 A | | 7/1996 | Sauter | 395/200.01 |
| 5,555,375 A | | 9/1996 | Sudama et al. | 395/200.03 |
| 5,557,721 A | | 9/1996 | Fite et al. | 395/148 |
| 5,559,958 A | * | 9/1996 | Farrand et al. | 714/27 |
| 5,572,643 A | | 11/1996 | Judson | 395/793 |
| 5,579,469 A | | 11/1996 | Pike | 395/326 |
| 5,594,792 A | | 1/1997 | Chouraki et al. | 379/269 |
| 5,596,744 A | | 1/1997 | Dao et al. | 395/610 |
| 5,596,748 A | | 1/1997 | Kliewein et al. | 395/610 |
| 5,616,850 A | * | 4/1997 | Sage et al. | 73/23.31 |
| 5,742,762 A | * | 4/1998 | Scholl et al. | 709/200 |
| 5,764,886 A | * | 6/1998 | Danielson et al. | 714/47 |
| 5,764,955 A | * | 6/1998 | Doolan | 709/223 |
| 5,812,639 A | * | 9/1998 | Bartholomew et al. | 379/89 |
| 5,903,731 A | * | 5/1999 | Vincent et al. | 709/226 |
| 5,949,891 A | * | 9/1999 | Wagnet et al. | 381/98 |

OTHER PUBLICATIONS

Downloaded from Worldwide Web on May 6, 1997; "SAP Delivers R/3 3.1 Internet Solution", pp. 1–6.

Down Loaded from Worldwide Web on May 6, 1997, C. Heinrich Et Al, "Decision Support from the SAP Open Information Warehouse", pp. 1–10.

Object Stream™ Web Page for Produei Overview; ©1997, pp. 1–6 http:/www.objectstream.com/objectstream/products/products.html.

Objectstream™ Web Page for Rosetta Technology; ©1997 http:/www.objectstream.com/objectstream/products/rosetta.html.

Objectsteam™ Web Page for Managed Object Interface (MOI) Technology ©1997; http:/www.objectstream.com/objectstream/products/moi.html p. 1.

Object Stream™ Technical Note; *Rosetta: Foundation for Configurable Mediation;* 201 1997, pp. 1–4.

Object Stream™ Technical Note; *Configurable Mediation Technology;* 201 1997 pp. 1–5.

ObjectStream™ Technical Note; *Configurable Q3 Mediation;* ©1997, pp. 1–5.

ObjectStream™ Product Brochure for "ObjectStream Mediator™".

Object Stream™ Product Brochure with "Overview".

* cited by examiner

114

```
Netscape - [System Configuration]                                    _ □ ×
File  Edit  View  Go  Bookmarks  Options  Directory  Window  Help
```

Location: http://td2k101/config/sysconf.ehtml

System Configuration

This page allows you to view and modify any of the system wide configuration parameters shown below.

| | | | |
|---|---|---|---|
| admin_password = | optim | update | reset | ←116
| (Password for Administrative Operations) | | | |
| config_password = | optim | update | reset | ←118
| (Password for Configuration Operations) | | | |
| fax_number = | 555-1031 | update | reset | ←120
| (fax number of management hub) | | | |
| hub_ip_address = | 199.99.200.4 | update | reset | ←122
| (IP Address of hub network manager) | | | |
| ip_address = | 199.99.200.2 | update | reset | ←124
| (IP Address used by the system for TCP/IP connections) | | | |
| primary_hub_phone = | 555-1212 | update | reset | ←126
| (Phone number used to reach HUB site) | | | |

Document Done

DEVICE MANAGEMENT SYSTEM FOR MANAGING STANDARDS-COMPLIANT AND NON-COMPLIANT NETWORK ELEMENTS USING STANDARD MANAGEMENT PROTOCOLS AND A UNIVERSAL SITE SERVER WHICH IS CONFIGURABLE FROM REMOTE LOCATIONS VIA INTERNET BROWSER TECHNOLOGY

FIELD OF THE INVENTION

The invention relates to a universal device management system for managing multi-vendor devices using a single-standard manager to eliminate the need for multiple, device-specific, proprietary managers. The invention further relates to a site server which is configurable using Worldwide Web browser technology to translate native protocols and formats of multiple devices into a single, standards-based management protocol.

BACKGROUND OF THE INVENTION

Commercial and non-commercial organizations are becoming increasingly reliant on computer systems and the extension of information resources to remote locations via data communication networks to maintain high productivity levels, while operating within budgetary constraints. Accordingly, it is becoming increasingly important to control and manage devices such as power supplies, modems, switches, multiplexers, private branch exchanges, uninterrupted power supplies, appliances and sensors for environment control and patient monitoring, for example, at remote locations from a central management site. Communication technologies allow these organizations to communicate with remote devices; however, the maximum advantage of these communication technologies cannot be realized without well-planned, proactive management structures in place, such as standards-based management centers that are capable of supporting networks and systems from different vendors.

A number of network management systems have been proposed; however, these network management systems (NMSs) typically require agents in the devices themselves which communicate with a manager using a protocol that the manager understands. Other kinds of NMSs use the management data that is collected by a manager to create enhanced visual systems. These NMSs are characterized by a number of limitations and disadvantages.

For example, a number of device management systems are vendor-specific, non-standard systems that are capable of managing only one type of device. With reference to FIG. 1, devices from vendors X, Y and Z are illustrated. The devices from vendor X each comprise an agent for management through a manager available from vendor X. Likewise, the devices from vendor Y are managed by a different manager than that of vendor X. This situation requires extensive training on the part of an operator to learn the different vendor-specific management interfaces and protocols of both vendors X and Y. In addition, a number of devices, such as those of vendor Z, are unmanaged.

U.S. Pat. No. 5,261,044, to Dev et al, and U.S. Pat. No. 5,594,792, to Chouraki et al, disclose high-level, network managers, as opposed to device managers described with reference to FIG. 1. The systems disclosed in these two patents illustrate post-processing, network management tools that manipulate data that has already been collected from managed devices and generate enhanced user displays of network configurations using collected device data. These systems manipulate data that has already been obtained from a management system and assumes that a network manager is already configured to be able to physically command a device. These systems are not concerned with communication with the devices themselves to generate raw data that can be used by any management system.

A need exists for a standards-based management system which enables virtually any device to be directly element-managed from virtually any manager. Further, a need exists for a universal device management system which brings each proprietary management system (e.g., the management systems of vendors X and Y) into a standard management domain, as well as manages devices such as those of vendor Z. Devices such as those of vendors X, Y and Z are commonly referred to as legacy devices since they were present within a system prior to the establishment of standards-based network management for that system, and are typically unmanaged or require management by a vendor-specific, non-standard management system. Organizations typically have remote sites where legacy-type devices are deployed, along with smart devices which can be managed from an umbrella-type management console employing, for example, Simple Network Management Protocol (SNMP).

SNMP is a known method for relaying network management information from devices on a network to management consoles designed to provide a comprehensive view of the network. SNMP comprises two major components, that is, the protocol itself and the Management Information Base (MIB). The protocol supports three basic operations, including Get request and response packets to receive information from a remote node, Set request packets to change a variable on a remote node, and Initiate Traps to send an event to a management station. The MIB is a set of managed objects or variables that can be managed. Each data element, such as a node table, is modeled as an object and given a unique name and identifier for management purposes. The complete definition of a managed object includes its naming nomenclature, syntax, definitions, access method (e.g., read-only or read-write) and status. SNMP utilizes an architecture that accommodates communication between one of a manager and a large number of remote agents, hereinafter referred to as SNMP agents, located throughout the network. SNMP agents use the MIB to provide a view of local data that are available for manipulation by a management console. In order for a variable to be monitored by the management console, the variable must be represented as a MIB object. The management console sends Get and Set requests to remote SNMP agents, and the SNMP agents initiate traps to the management console when unexpected events occur. Thus, most of the burden for retrieving and analyzing data rests on the management application. Unless data is requested or requested in a proactive way, little information is shown on the management console. The SNMP is a connectionless protocol that runs over the User Datagram Protocol (UDP) and Internet Protocol (IP) stack.

With continued reference to FIG. 1, the high development costs required to bring each proprietary device management system into a standards-based device management domain are frequently the reason why many legacy devices remain unmanaged. Legacy devices are, therefore, frequently removed from systems long before their operational life span and purpose expires. Thus, a need exists to lessen the custom development efforts required to bring such proprietary device management systems into standards-based device management domains.

The network management systems disclosed in U.S. Pat. No. 5,261,044, to Dev et al, and U.S. Pat. No. 5,594,792, to Chouraki et al, permit various devices and their characteristics and behaviors to be modeled and stored in a database which is accessed to manage the devices. The process of modeling the rules and behavior of different types of devices into data structures of model databases is typically performed by a network operator who is knowledgeable of all of the functional characteristics and operational requirements of the devices to be managed. Thus, modeling of devices for management requires specialized software programming. A need exists for an application program which guides a user in an intuitive manner when converting a non-standard management interface of a device into an integrated management interface of a universal network management system that is capable of managing devices from different vendors.

A network management system software tool developed by ObjectStream, Inc., Pleasanton, Calif., has been proposed to facilitate interface development to integrate different kinds of network elements or devices into multiple network management systems. The software comprises a proprietary editor module that is a JAVA Applet which provides a simple graphical interface to allow users to create and edit simple templates that structure the resources and attributes of different network elements in accordance with a proprietary definition for an interface. Users access the editor module via a Worldwide Web browser. The editor module is a structured library and interpretive software component of another software module (hereinafter referred to as the mediation module) that performs real-time translation of messages between network elements and different network management systems, that is, between the proprietary interface and the frameworks required by different managing applications.

The ObjectStream™ network management software tool requires users to develop end applications, that is, the software tool requires users to write software via the editor module for each device to be managed and to assemble various hardware and software components required for the end application. The system is disadvantageous because the descriptions of devices to be managed that are created using the templates of the editor module are not standards-based. Thus, for each device that is managed using the network management system, software must be devised on a device-by-device basis. Further, the ObjectStream™ network management software tool is similar to the systems disclosed in the aforementioned U.S. Pat. Nos. 5,261,044 and 5,594,792 in that it is a post-processing tool. The software tool is used for processing data that has already been retrieved from managed devices, and assumes that network managers are already configured to physically command the devices. A need exists for a network management system which allows the resources and attributes of virtually any network device to be modeled using a standards-based data structure and without requiring software development. A need also exists for a device management system that is easily configurable and ready for use with managed devices and remote managers without having to assemble the components thereof to create an end application.

SUMMARY OF THE INVENTION

In view of the foregoing disadvantages and limitations, it is an object of the present invention to provide a system and method for managing devices from multiple vendors using one network manager, thereby eliminating the need for multiple, device-specific, proprietary management systems, and substantial software development to manage a new device.

A further object of the present invention is to make it possible for users to manage virtually any device from virtually anywhere using a combination of communications resources, such as Direct Dial via a public switched telephone network (PSTN), a corporate intranet, the Internet, facsimile and wireless services such as paging.

It is a further object of the present invention to provide a site server to which different types of devices are connected and which translates the native interfaces of the devices to MIB-based format for management by off-the-shelf SNMP and WEB managers. Alternatively, the native interfaces of devices can be translated into formats required by other network management protocols, such as Common Management Information Protocol (CMIP) and Telecommunications Management Network (TMN) protocol.

It is still a further object of the present invention to allow users to configure the site server using a Web browser and without having to employ a skilled network management expert to write program code.

Another object of the present invention is a system and method for consolidated monitoring and control of standards-compliant devices such as hubs, switches, routers and network access servers and non-compliant devices such as multiplexers, contact closure sensing devices and analog inputs from a single management center based on open standards.

Another object of the present invention is to provide a user with an integrated site server which allows the user to plug-in different devices and to configure the site server to control and monitor the devices without having to add hardware or modify existing hardware.

These and other objects of the present invention are achieved, in part, by providing users with a remotely accessible integrated site server having a plurality of ports for connection to different devices to be managed from remote locations. The ports of the site server are configurable from a remote location via Web browser technology and can be a contact closure-type port, a serial port an or analog port. The site server also comprises a modem and a local area network (LAN) access board, such as an Ethernet 10-BaseT board, to communicate with remote users via a PSTN, an intranet and the Internet.

In accordance with one aspect of the invention, the site server is provided with an SNMP agent, a Web server, a relational database, and a database for storing HTML pages and MIB files. The site server is programmed to generate a plurality of pages dynamically which are presented as Web pages to remote users at remote computers running browser software. The pages guide the user to enter attributes of devices and other information to associate devices with MIBs for different types of devices to be managed from the site server.

In accordance with another aspect of the present invention, the integrated site server is programmed to generate Web pages to allow users to configure the site server to manage a particular device by specifying a managed device driver, and selecting from port configuration options and port drivers, alert messaging options and MIB file administration options.

In accordance with another aspect of the present invention, the system provides a method of guiding a user when mapping native device interfaces into standards-based management operations such as SNMP operations.

In accordance with yet another aspect of the present invention, the integrated site server is provided with a TCP/IP sub-system capable of responding to more than one IP address to allow different devices connected to the server to have their own IP addresses. In addition, groups of SNMP variables can be aggregated and sent as a single command to a device from an SNMP manager. Also, the devices can be configured in accordance with the present invention to return information to an SNMP manager relating to a plurality of parameters or SNMP variables using a single response from the device.

BRIEF DESCRIPTION OF THE DRAWINGS

The various objects, advantages and novel features of the present invention will be more readily apprehended from the following detailed description when read in conjunction with the appended drawings, in which:

FIGS. 4–29 illustrate a number of computer Web pages transmitted from an integrated site server to a remote user for guiding the user when entering information to relate a selected device with a MIB and to configure the site server to manage the device.

Throughout the drawing figures, like reference numerals will be understood to refer to like parts and components.

DETAILED DESCRIPTION OF THE PREFERRED EMBODIMENTS

Figure 1:
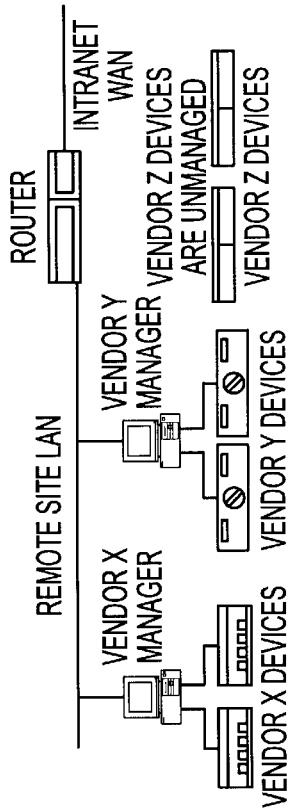
FIG. 1 is a diagrammatic illustration of an existing network management system comprising device-specific network managers and unmanaged devices.
Figure 2:
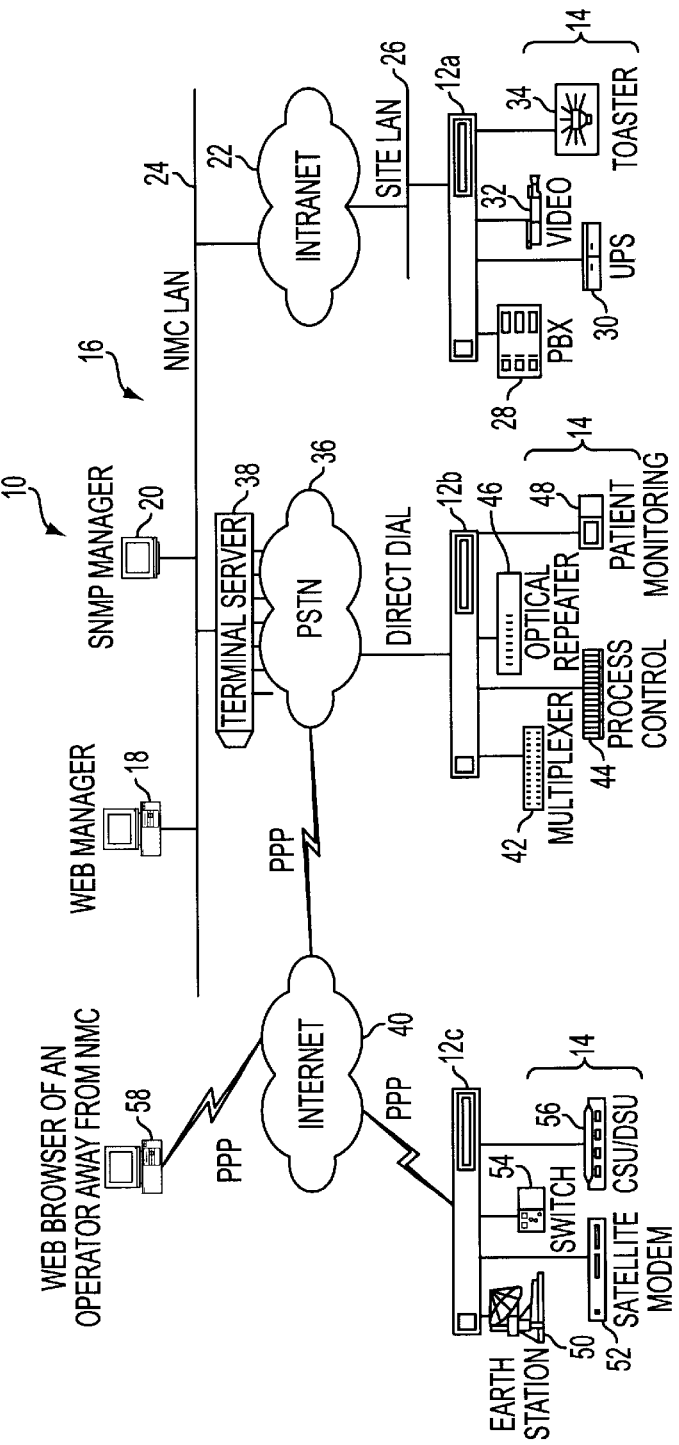
FIG. 2 is a diagrammatic illustration of a network management system constructed in accordance with an embodiment of the present invention.

A network management system 10 constructed in accordance with an embodiment of the present invention is depicted in FIG. 2. For illustrative purposes, the network management system 10 is described in connection with the SNMP. It is to be understood, however, that the system 10 can be used with other network management protocols such as CMIP and TMN, among others.

The system 10 comprises at least one site server 12 to which a number of devices indicated generally at 14 can be connected. The devices 14 can be non-SNMP manageable devices, as well as legacy devices which were previously considered to be unmanageable until connected to a site server 12 constructed in accordance with the present invention. Further, the site server 12 can operate as a gateway for SNMP-manageable devices connected, for example, to a site LAN 26. The site server 12a can monitor activity of the SNMP-manageable devices and provide alternate paths (e.g., via a Ethernet board 62 or a modem 60 described below) for communicating with the managers 18 or 20.

With continued reference to FIG. 2, a first server 12a is shown connected to a network management center 16 comprising a Web manager 18 and a SNMP manager 20 via a corporate intranet 22, that is, the Web manager 18 and the SNMP manager 20 are connected to an NMC LAN 24. The site server 12a is connected via the site LAN 26 to the NMC LAN 24 via the intranet 22. The devices 14 connected to the server 12a consist of a private branch exchange 28 (i.e., an SNMP manageable device), as well as non-SNMP manageable devices such as an uninterrupted power supply (UPS) 30 and a video camera 32, and previously unmanageable devices 34 such as a toaster oven 34 or other appliance. In addition to an intranet, site servers 12 can communicate with the NMC LAN via a PSTN 36 using direct dial and a terminal server 38, as well as via the Internet indicated at 40 using point-to-point protocol (PPP). For illustrative purposes, the site server 12b is configured to manage a multiplexer 42, a process control device 44, an optical repeater 46 and patient -monitoring sensors 48. The site servers 12 are configurable for virtually unlimited applications for device management across many industries, including but not limited to telecommunications, medical instrumentation, manufacturing, process control, utilities management, and remote monitoring and/or control of environmental equipment and home appliances. Finally, another illustrative site server 12c is depicted as being configured to manage devices such as an earth station 50 in a satellite system, a satellite modem 52, a switch 54 and a channel service unit/data service unit (CSU/DSU) 56.

In accordance with another aspect of the present invention, a user can configure a site server 12 to manage devices remotely with respect to the NMC 16. The user uses a computer 58 on which a Web browser or other browser-type software program is being executed to connect to the Internet 40.

Figure 3:
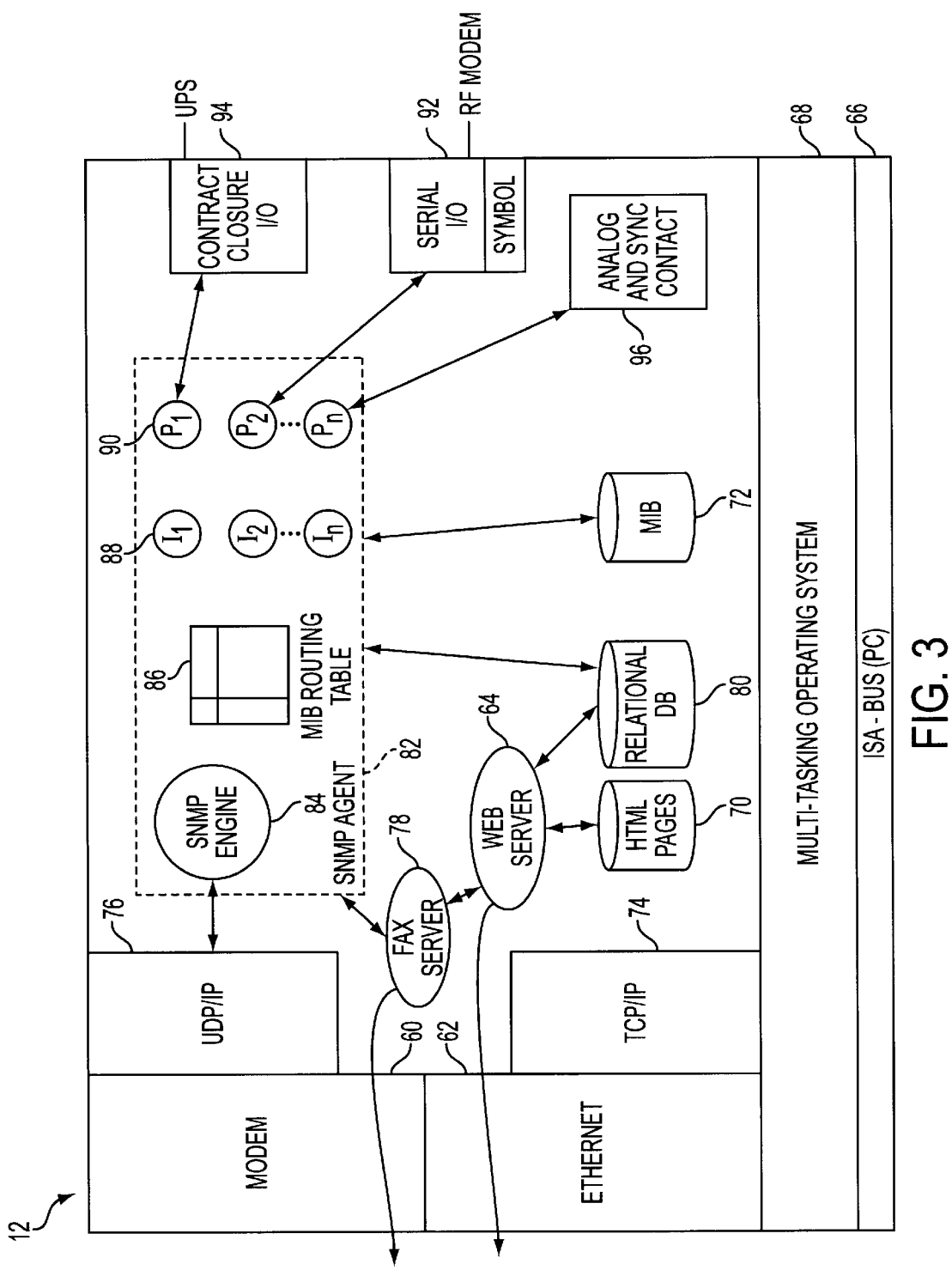
FIG. 3 is a block diagram illustrating various hardware and software components of an integrated site server constructed in accordance with an embodiment of the present invention.

As shown in FIG. 3, a site server 12 is provided with a modem 60 and preferably an Ethernet 10-BaseT board 62. The site server 12 is also provided with a Web server 64 for communicating with the user's computer 58. The site server 12 operates using an ISA-Bus architecture 66 for personal computers, although other bus architectures can be used. The site server 12 also operates in accordance with a multi-tasking operating system, such as a Device Management Operating System (DMOS) 68. The site server 12 is programmed to download pages in the form of HTML-formatted Web pages 70 to the Web server 64 for transmission to the user's computer 58 via the Internet 40. Some of the pages are described below in connection with FIGS. 4–29. These pages are useful to guide a user to enter configuration information to associate a particular device to be managed from the site server 12 to a MIB table in a MIB indicated generally at 72.

In addition to Ethernet routing, the site server 12 is configured to perform PPP Dial-up routing on-demand, as well as dedicated routing. The server comprises software indicated generally at 74 and 76 to process TCP/IP and UDP/IP data, respectively. The server therefore supports Direct Dial access through a PSTN, as well as corporate intranet and Internet connections. Thus, the flexible architecture of the site server 12 permits users to choose to the most optimal wide area network communication service for managing remote sites.

With continued reference to FIG. 3, the site server 12 comprises a facsimile server 78 which is useful for transmitting reports to the user computer 58, as will be described in further detail below. A relational database 80 is provided for storing configuration data which, when used in connection with MIB files, allows native interfaces of devices to be interpreted as SNMP operations, thereby allowing a single SNMP manager 20 or Web manager 18 to manage different kinds of devices 14 connected to the site server 12, such as SNMP-manageable devices, previously unmanageable or legacy devices and non-SNMP-manageable devices. The site server 12 comprises an SNMP agent 82 which receives commands from a NMC manager 18 or 20 via the modem 60 or Ethernet board 62, depending on the wide area network architecture chosen by the user for connecting the site server 12 to the SNMP manager. The SNMP agent 82 comprises an SNMP software engine 84 for processing SNMP protocol data units or packets received from the manager. The processes of interpreting the SNMP packets, which can comprise one of the five types of SNMP verbs (e.g., GetRequest, GetNextRequest, SetRequest, GetResponse and Trap) preferably use a MIB routing table 86, a managed device driver (MDD) 88 and port drivers 90, as well as the MIB 72. If the system 10 is used in connection with another protocol such as CMIP, the agent 82 and MIB 72 are adapted accordingly. For example, the MIB 72 is formatted in accordance with GDMO/ASN.1.

The site server 12 preferably supports eight serial ports indicated generally at 92 for handling RS-232/422/485 interfaces, as well as 12 contact closure ports which are indicated generally at 94. The server can also be configured to support analog ports which are indicated generally at 96. The relational database 80 is preferably an SQL database engine. The CPU is a conventional single-board computer based on an Intel-compatible central processing unit (e.g., a 386 computer or better) with at least 16 megabytes of RAM (not shown). The modem is preferably a class 2 facsimile modem compatible card. A multi-input/output (MIO) card (not shown) is provided to perform most of the IO functions. The MIO card provides the eight RS-232/422/485-compatible ports, a 10-BaseT Ethernet port, a unique hardware identification code for authentication and licensing purposes, connections for a contact closure input/output card, as well as connectors to route modem signals to the back panel of the server.

The DMOS 68 is preferably used to start the site server 12 and the application software at power-up, to perform time slicing application programs, to manage disk storage, to support networking operations (e.g., TCP/IP and UDP operations), both over the 10-BaseT Ethernet board 62 connection and over dialogue connections using the modem 60, to provide low-level device drivers, as well as enforce security by limiting files to which application programs have access and the actions these programs can perform. The operating system is preferably loaded from disk from a boot programmable read-only memory (PROM) and is configured to start all necessary application programs.

The relational database 80 is used to store configuration information, as stated previously. The database organizes information in terms of named tables. Each table comprises a number of rows, and each row has a number of named columns. The database 80 allows rows or specific columns within rows to be selected on the basis of information in the rows. The Structured Query Language (SQL) is preferably used internally with respect to the database 80 and associated applications, and is not required to be used by an operator of the site server 12.

The Web server 64 allows communication between a remote computer 58 and the site server 12 using HyperText Transfer Protocol (HTTP) and HyperText Markup Language (HTML). HTTP transactions request a specific page and optional query information. When a user at a computer 58 sends an HTTP request for a specific page to the site server 12, the site server 12 responds with a stream of information that is preferably encoded using HTML. The stream of information is then translated by the computer 58 into an on-page display of information. This information can contain text, graphics, entry panels or select buttons, as shown in FIGS. 4–29.

The information presented by the Web server 64 is organized as pages with links to allow movement from one page to another. Some pages are simply files stored on the hard disk of the server 64 and are returned to the user at the remote computer 58 unchanged. Most pages, however, are generated by the server 64 based on the page request or path and the query information transmitted by the user. The Web server 64 can be configured to pass requests for pages from the user which match a specified pattern to another program. This program is responsible for returning valid HTML to the user based on the user's request. Thus, no file exists in memory that is associated with the request, but rather the program synthesizes the data as required, thereby creating a synthetic page.

Figure 25:
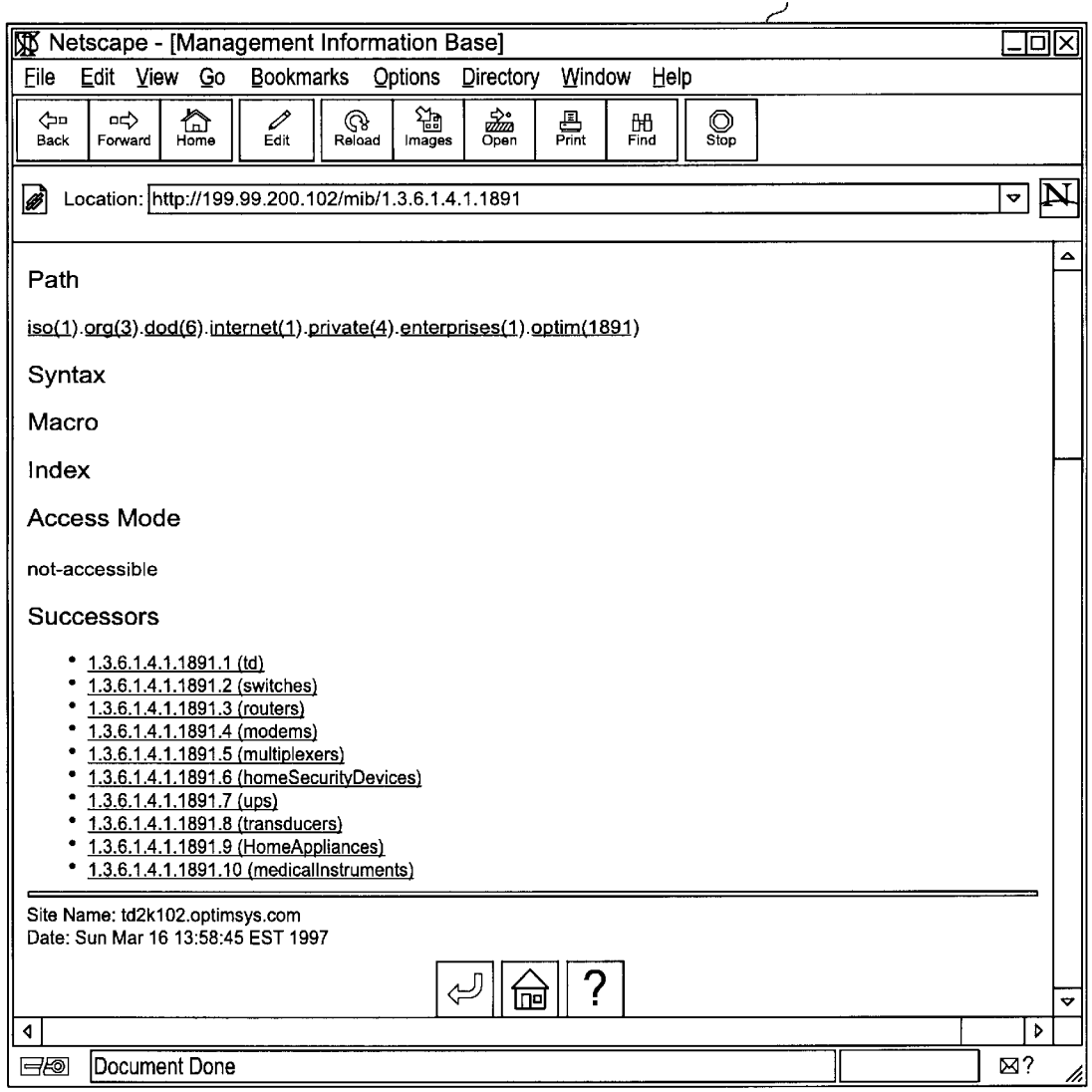

As will be described below in connection with FIGS. 25 and 26, MIB browser pages are provided which are examples of synthetic pages. When a request from a user does not match any of the paths associated with synthetic pages, the Web server 64 is operable to examine the file system of the server 64 for a file with the same name as the request. However, if the request is for a file ending with ".html", and a file in the same directory ending with ".ehtml" is located, the latter file is assumed to be HTML with embedded procedures. This file is subjected to special processing before being returned to the user.

The Web server 64 supports a scripting language. Scripting provides extensions to allow commands to operate on the relational database 80. The Web server 64 searches the .ehtml file for fragments of the scripting language delimited by marker sequences. Before the sequence is sent back to the user, fragments and delimiters are replaced with the result of executing the script fragment in the scripting language. Since the scripting language can execute database queries or updates, the language can be used to return information from the relational database 80 to the user. Embedded scripts are also used to create HTML for the header and footer sections of pages sent to the user. These scripts reference configuration information loaded by the Web server 64 at start-up time, allowing modification of the look of the pages in the system by changing the configuration information.

The scripting language provides a mechanism for selectively loading groups of related functions when they are needed. These groups are called "packages". These packages consist of either additional scripts or compiled and dynamically loadable object code. Dynamic loading allows the Web server 64 to start with a minimal amount of functionality, and to load only those routines and support libraries that are required.

Some pages have areas that allow the user to enter data or to select options. The areas are called forms. Forms are used to allow the user to enter or modify configuration data that is stored in the database 80. When the user has entered the desired data and made the desired selections, the user submits the data by means of a Submit or Return button, for example, on the form page. This Submit button causes the user to generate a HTTP request for a page with the data entered by the user encoded in the request. The Web server 64 operates on the basis of this encoded information, by returning a page with embedded HTML where the embedded scripts, when evaluated, access the encoded form information and act based on this information by typically updating the relational database 80.

During evaluation of the embedded scripts, the "query fields" are accessible, and can be used to update the database 80 or control the information displayed on the page at the computer 58. The SNMP agent 82 processes requests from SNMP managers 20 over the IP network by accepting UDP datagrams according to the SNMP protocol. These datagrams are interpreted as Get, Get-Next, Set or Get-Bulk commands and the correct response is returned. The SNMP agent 82 also, when necessary, sends unsolicited Trap messages to indicate unexpected events. The SNMP agent 82 can be configured to communicate using either version 1 of the SNMP or version 2 of the SNMP which has user security. The SNMP agent 82 is preferably implemented using a scripting language with extensive built-in SNMP extensions.

Configuration of the SNMP agent 82 preferably occurs in two phases. First, a small file provides enough information to initialize a configuration start-up program and access the database 80. In the second configuration phase, detailed configuration information required to communicate with the managed devices and to send information to the network management stations 18 or 20 is read from the database 80. During this second phase, the required instrumentation drivers 88 and port drivers 96 are demand-loaded by the SNMP agent 84. In other words, a driver is preferably only loaded into the SNMP agent 84 from the database 80 when the database 80 indicates that a driver is required. In addition, all of the information necessary to load a driver is preferably provided in the database 80 and the configuration files. This allows additional drivers in the field without having to recompile or relink the SNMP agent 84 software.

A compiled-in software module manages the SNMP transactions on an event-driven basis. The above-referenced configuration process arranges for this by first loading the required MIBs. The required MIBs specify the universe of possible managed instance variables, with descriptions and type information. Next, variables in the scripting language are bound to specific MIB instances. This binding operation indicates to the SNMP engine 84 the variable to set when a Set command is received, and where to get the value for the instances when a Get command is received. Call-back functions to Get and Set operations are bound on MIB sub-trees. This indicates to the SNMP agent 82 that a specific procedure should be run during processing of SNMP operations. For Get operations, the procedure is run just before the engine 84 reads the value from the variable, and for Set operations, the procedure is run just after the variable has been set to the new value. The Call-back functions are the routines that transfer data to and from the external devices 14. The SNMP engine 84 then handles all aspects of SNMP operations, that is, for a Get operation, the engine 84 executes the Call-back function (which communicates with the managed device to determine the value of the desired parameter and set the bound variable accordingly), extracts and formats the new value from the bound variable, and properly encodes the response. For a Set operation, the SNMP engine 84 sets the bound variable to the new value, and then calls the Call-back function. The Call-back function examines the new value of the bound variable and sends the necessary commands to the managed device 14 to cause the change to occur.

Instrumentation drivers or MDDs 88 are software components that convert SNMP Get and Set operations into the sequences of events required to communicate with the managed device 14. These sequences of operations are described in the database 80 as a series of conversion operations that format the incoming or outgoing data into the correct form. Conversion operations are described in more detail below. Conversions can have side effects, such as adding an entry to the event log. The actual data transfer is managed by a port driver 90. Conversion operations are configurable via the WEB server 64.

For each type of port, and each use of a port, there is a port driver 90 responsible for configuring the low level hardware parameters (e.g., baud rate, parity, start bits and the like) and executing the read and write operations. Some port drivers 90 can also perform basic processing of incoming data, as well as comprising information necessary to load a port or instrument.

Alerts are pre-defined actions that are preferably triggered by any event that requires external action.

When the alert is triggered, one of several pre-defined actions can occur: (1) add an entry to the event log; (2) send a SNMP trap to a management computer; (3) send a message via facsimile to a specific telephone number; (4) send e-mail to a specified user name at a specified host; and (5) send a page to a specified pager number. These operations are configurable from a remote computer 58 via the WEB server 64. The messages sent by alerts (either by facsimile or e-mail) can optionally include portions of the event log. The amount of the event log that is sent is also a configurable parameter. There is also an option to wait a configurable amount of time before sending the event log. The combination of these two configurable parameters allow an alert operation to trigger a message that includes a record of all events occurring both before and after the event. This can be useful for determining the consequences of failures.

The event log keeps a record of important events which are preferably indexed by time. Entries in the event log can be displayed using the Web server 64. The Web server 64 also provides a facility to delete entries in the event log as follows: (1) delete all entries in the event log; (2) delete all entries that occurred more than one day ago; and (3) delete all entries that occurred more than one hour ago.

The process of configuring the site server 12 will now be described in more detail with reference to the pages illustrated in FIGS. 4–29. Before the site server can monitor and manage devices 14, the configuration process preferably must first be completed. The configuration process involves examination of the devices 14 to be managed, the physical and logical input and output requirements and the parameters to be monitored and/or controlled. The site server 12 is advantageous because it is designed to be configured from a remote computer 58 using a standard HTML/HTTP Web browser that communicates with the server 12 using TCP/IP. The user is guided through the configuration process by choosing selections from HTML pages 70 downloaded from the server 12 that describe various configuration operations. As stated previously, many pages comprise data-entry forms.

Figure 4:
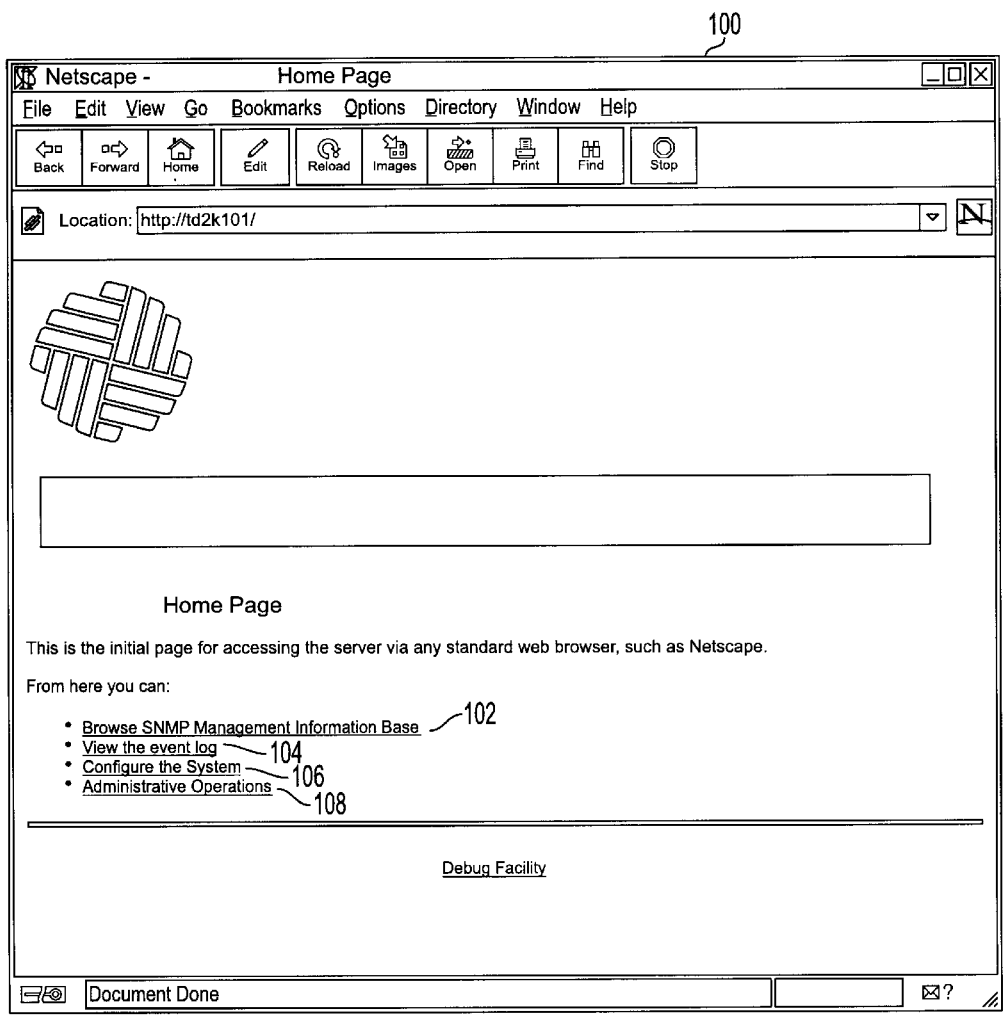
Figure 5:
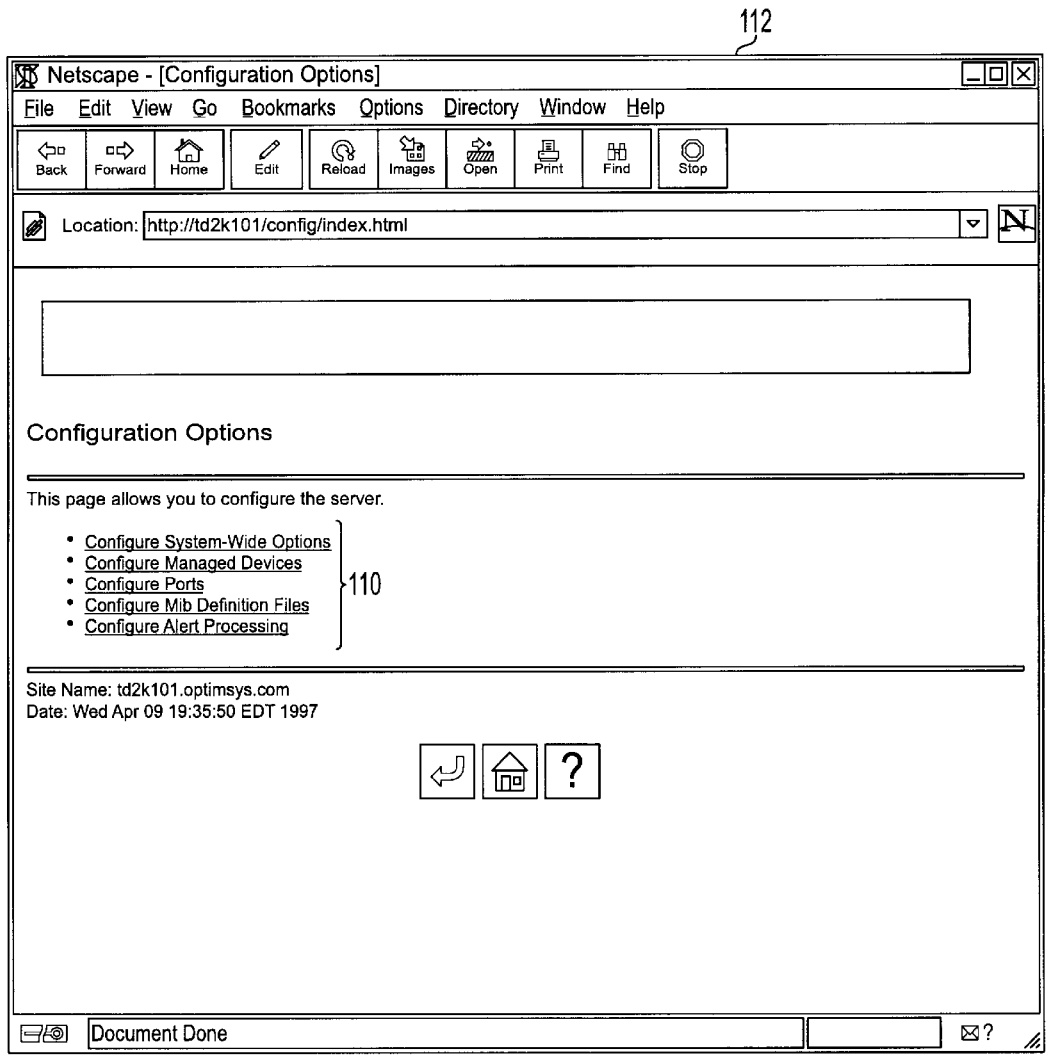
Figure 7:
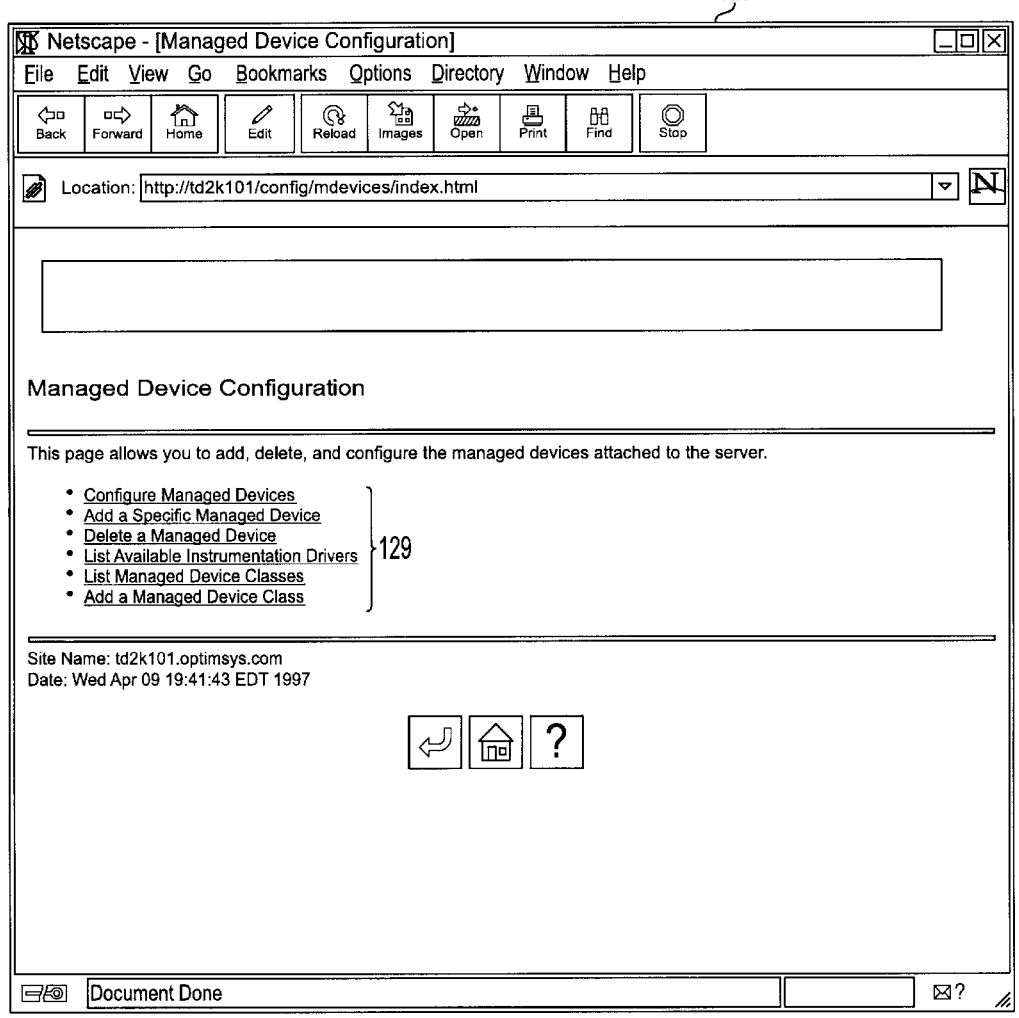

The home page 100 for the site server 12 is shown in FIG. 4. This page 100 provides users with options 102, 104, 106 and 108 to browse MIB files stored in the MIB database 72 to view event logs, to configure system-wide parameters, managed devices and ports that physically connect the managed devices 14 to the server 12, as well as perform a number of administrative operations, respectively. The configuration options are indicated generally at 110 on the page 112 depicted in FIG. 5. A user selects an option using an input device such as a mouse connected to the remote computer 58.

With reference to the page 114 depicted in FIG. 6, a system configuration table is provided which initially contains factory default values that can be customized by a user at a remote computer 58. The page 114 preferably requires a system administration password 116 before any modifications can be entered. In addition, a password 118 can be required before configuration operations can commence. The facsimile number 120 of a management hub can be provided which is useful for transmitting event logs and other reports to the hub, for example, using the facsimile server 78. In addition to the facsimile number, the IP address 122 and the telephone number 126 of the hub network manager is also preferably provided. The IP address 124 of the server 12 is also identified on the page 114. A boot floppy with a default IP address is preferably first used to power up the server 12. The IP address can then be modified using this page 114. The site server 12 can have different IP addresses for the Ethernet interface 62, as well as the PPP interface via the modem 60.

In accordance with another aspect of the present invention, the TCP/IP sub-system 74 in the site server 12 can be configured to respond to more than one IP address, thereby allowing a single computer to act as a host for multiple Web sites having different names. The site server 12 can also be configured to appear to network management systems as multiple hosts with different IP addresses. Since most network management systems graphically depict systems with a single icon for each IP address, the capability of the server 12 to accommodate aliasing, that is, more than one IP address, allows devices 14 connected to the server 12 to be depicted at the manager 18 or 20 as separate devices having their own IP address, even though the connected devices have no IP capability. With reference to the page 128 depicted in FIG. 7, the managed device configuration page 128 allows a user at a remote computer 58 to select from among a number of options indicated generally at 129, including but not limited to, configuration of any of the MIB variables of a managed device 14, addition or deletion of a managed device from the relational database 80, generation of a list of available instrumentation drivers 88 or managed device classes and the addition of a class. The MIB for the device has preferably already been created and loaded into the site server 12 after the boot process. A MIB table is supplied for each managed device class. A separate MIB file is preferably created for each MIB table. The procedure for adding a new table to the overall MIB database 72 is described in further detail below.

Figure 8:
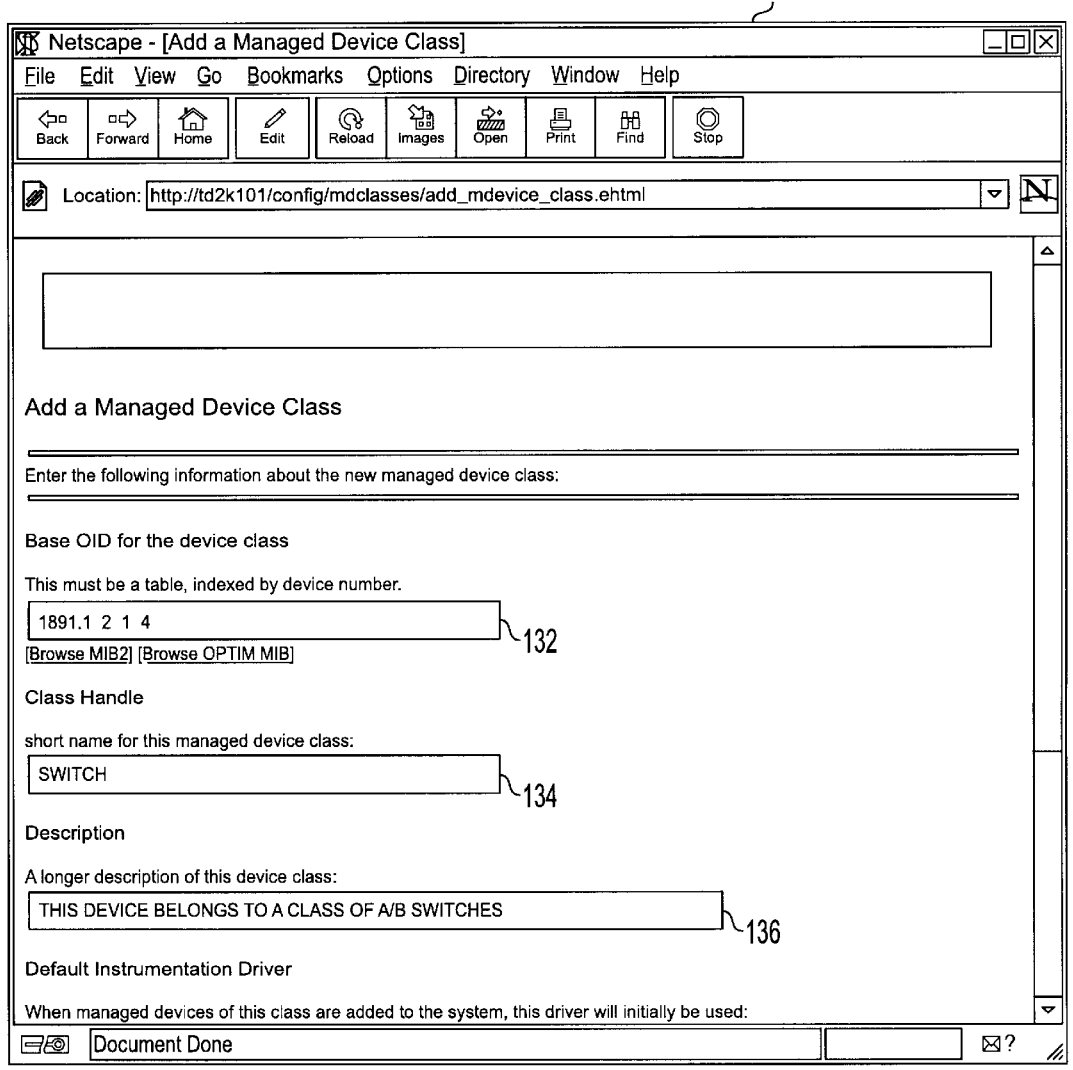
Figure 9:
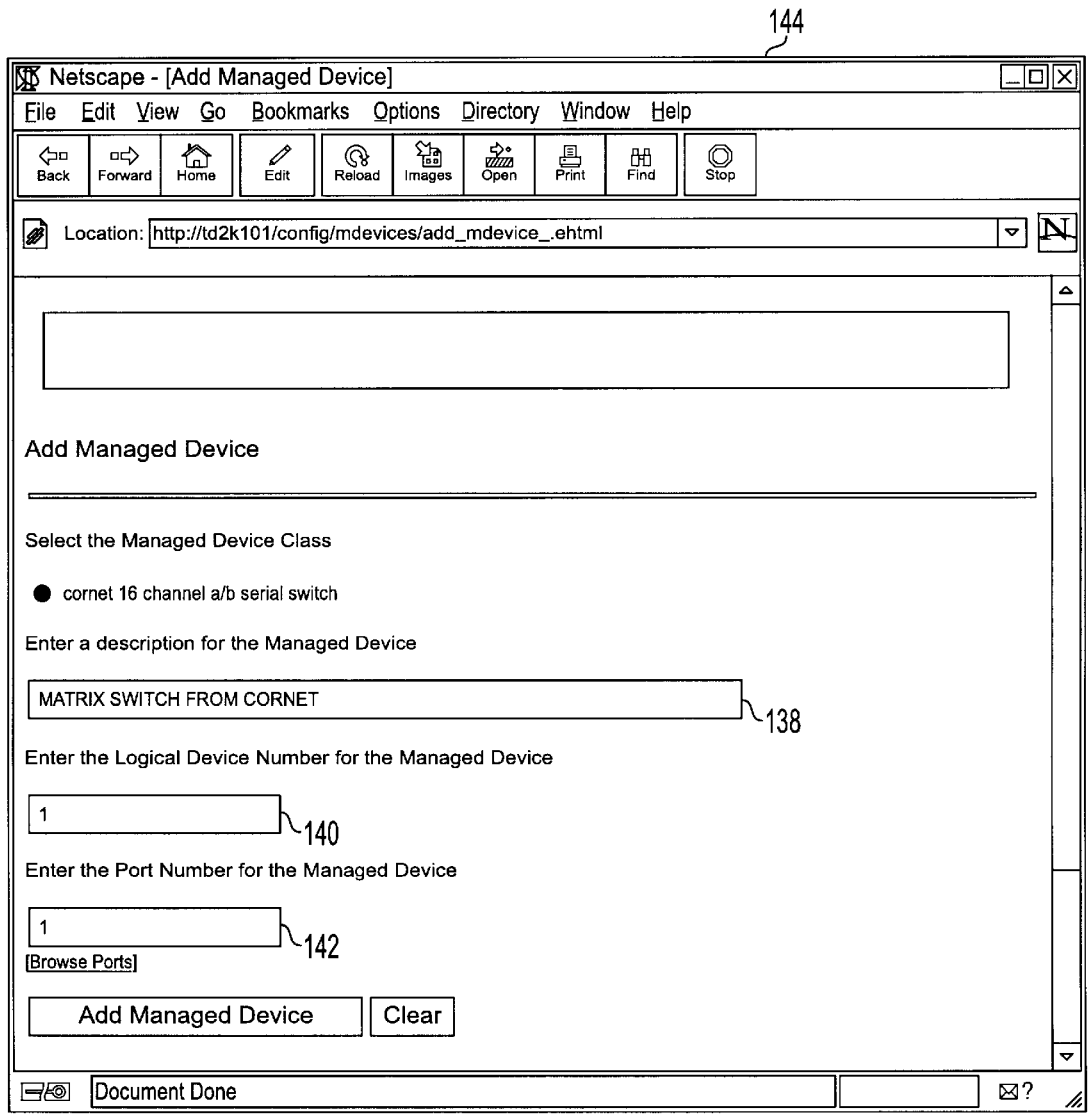

With reference to the page 130 depicted in FIG. 8, a managed device class can be added to the relational database 80 by specifying a table 132 indexed by a device number. A class handle 134, that is, a short name for the managed device class, can also be provided, as well as a description 136. To allow management of multiple identical devices by the site server 12, similar devices are grouped into classes. SNMP access to each member of a managed device class is through a single row of an SNMP table describing all managed members of the class. For example, to manage four identical devices, the MID comprises an SNMP table for these devices. The table has entries in columns which are variables that are to be read or set to control the device. The table further comprises four rows, that is, one for each device. The table is preferably indexed by an integer. This index is hereinafter referred to as the logical device number. The logical device number is preferably not unique across device classes. For each device class, the logical device number preferably starts at an integer 1 and increases by 1 for each managed device added to the system. Fields 138, 140 and 142 for entering a description of a managed device, the logical device number and a port number for the device, respectively, are provided in page 144 illustrated in FIG. 9. This page guides the user in selecting a managed device class.

Figure 10:
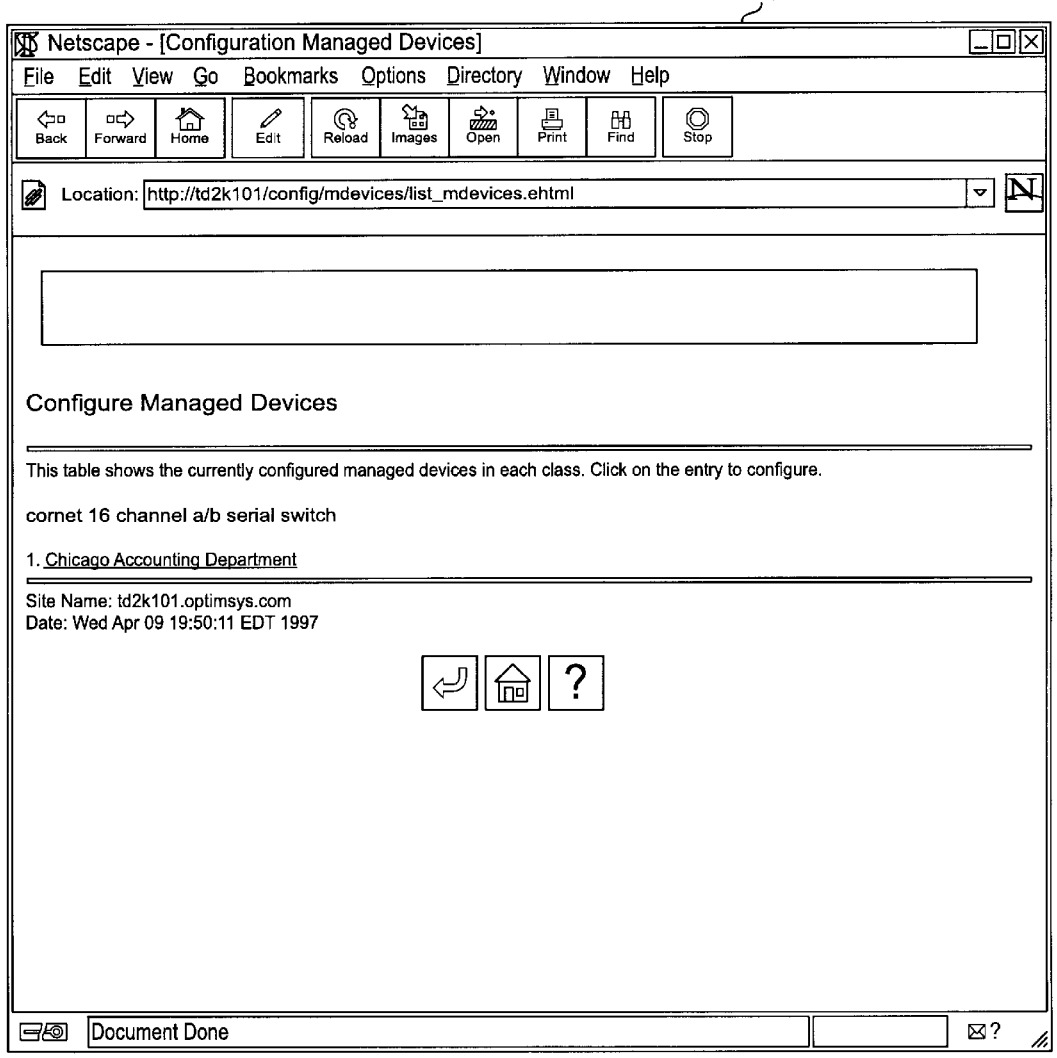
Figure 11:
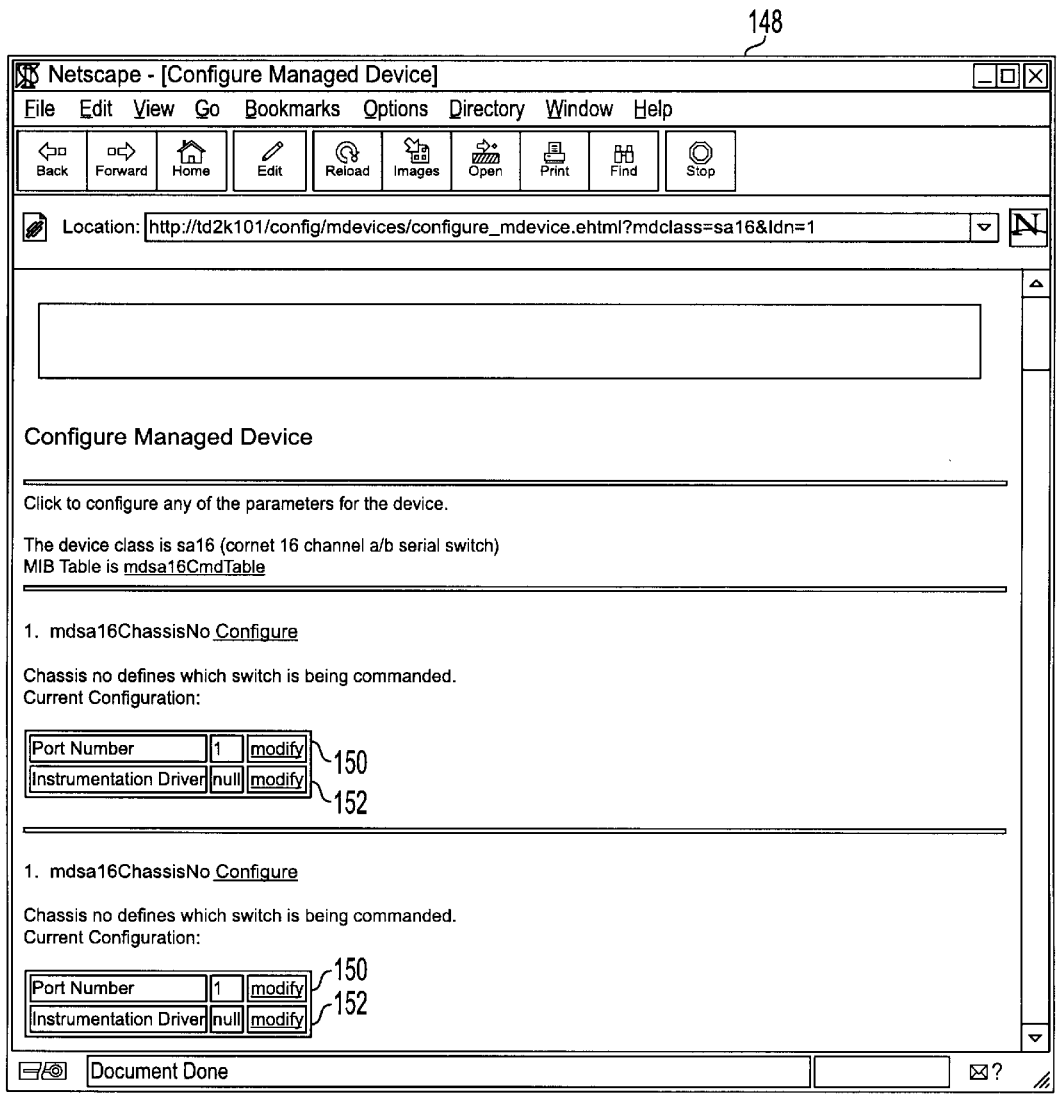

With reference to FIG. 10, page 146 indicates the currently configured managed devices in each class. To configure a managed device selected using page 146, a page 148 is generated which is indicated in FIG. 11. For each MIB variable or parameter to be configured, two options 150 and 152 are available to the user, that is, selection of a port number and an instrumentation driver, respectively. The port number 150 is the physical port of the site server 12 attached to the device 14 being managed. The port number 150 can be entered manually or selected using an option list. The port numbers are identified on the back of the site server 12 chassis. The instrumentation driver 152 field allows the user to select the appropriate driver 88 that is used to command the managed device. For example, one of the available instrumentation drivers 88 is a serial command response (SCR) driver. Other types of instrumentation drivers 88, however, are provided via the site server 12 such as a page scraping driver, a menu-based driver and custom drivers.

Figure 12:
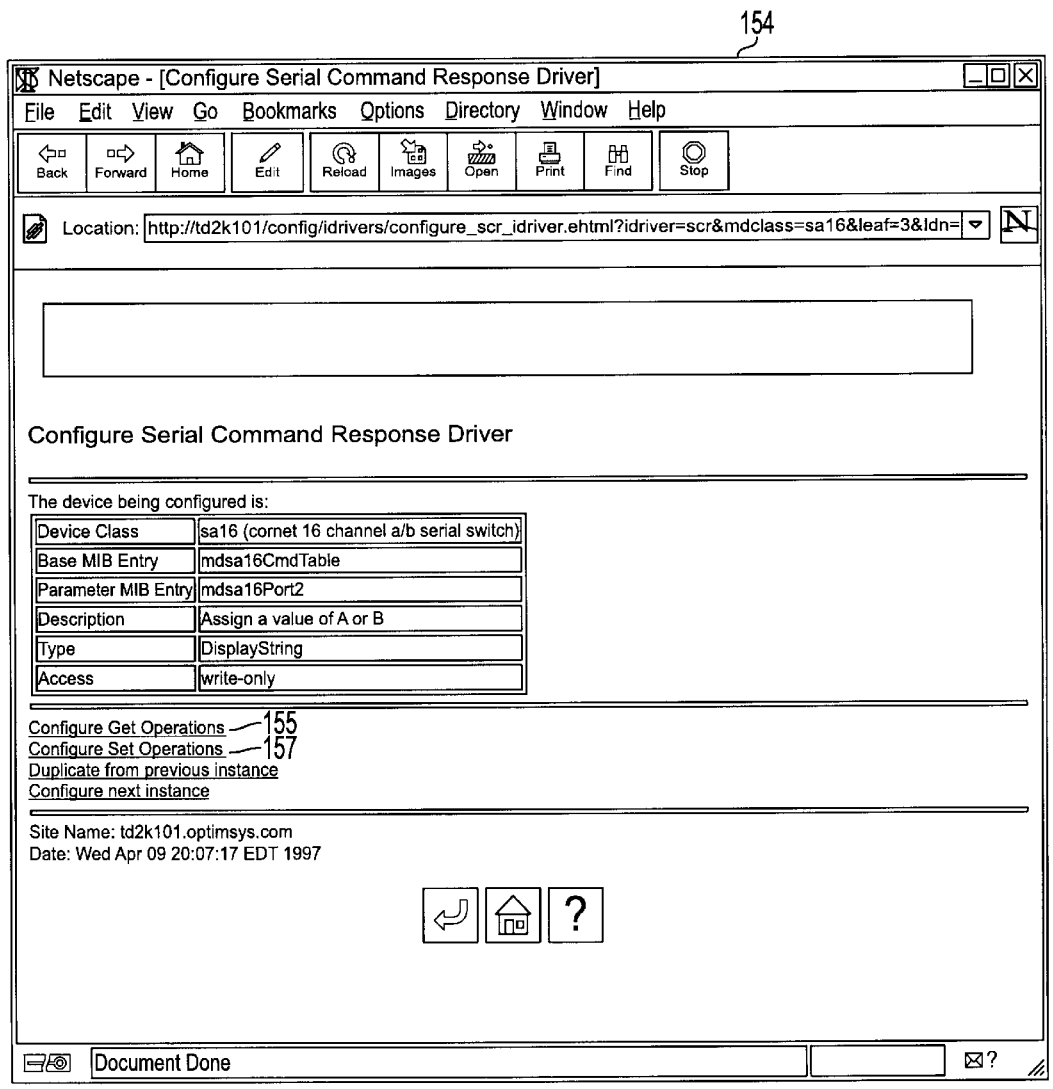

Configuration of the driver 88 is permitted by using the page 154 depicted in FIG. 12. For illustrative purposes, the configuration of an SCR driver will be described. Once the driver is selected for a given parameter or variable, SNMP Get and Set options are configured for that variable by selecting one of the options 155 and 157 listed on the page, respectively. The pages 156 (FIG. 18) and 158 (FIG. 14) are subsequently downloaded to the computer 58 from the site server 12 to allow entry of configurable parameters.

Figure 13:
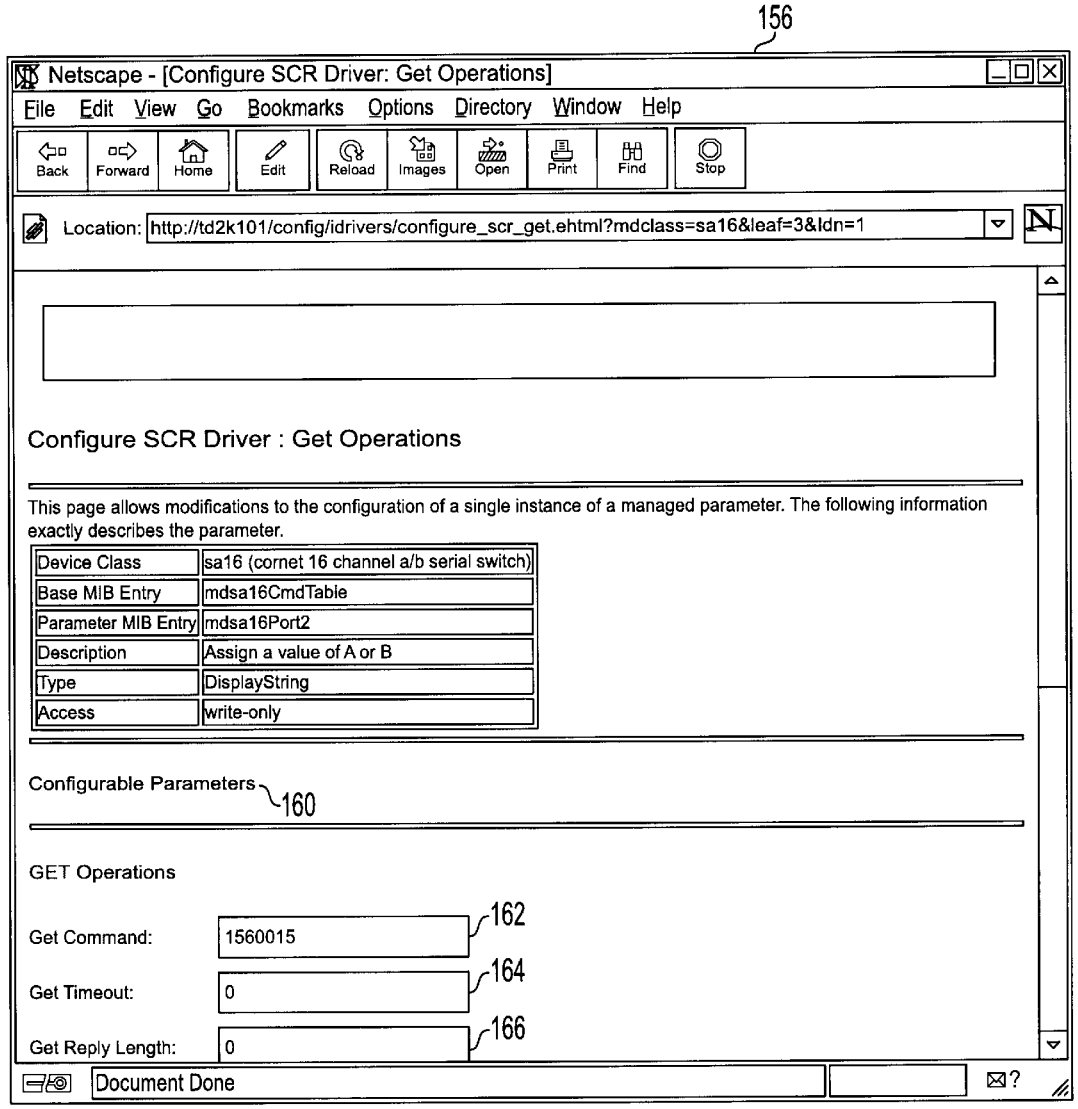
Figure 14:
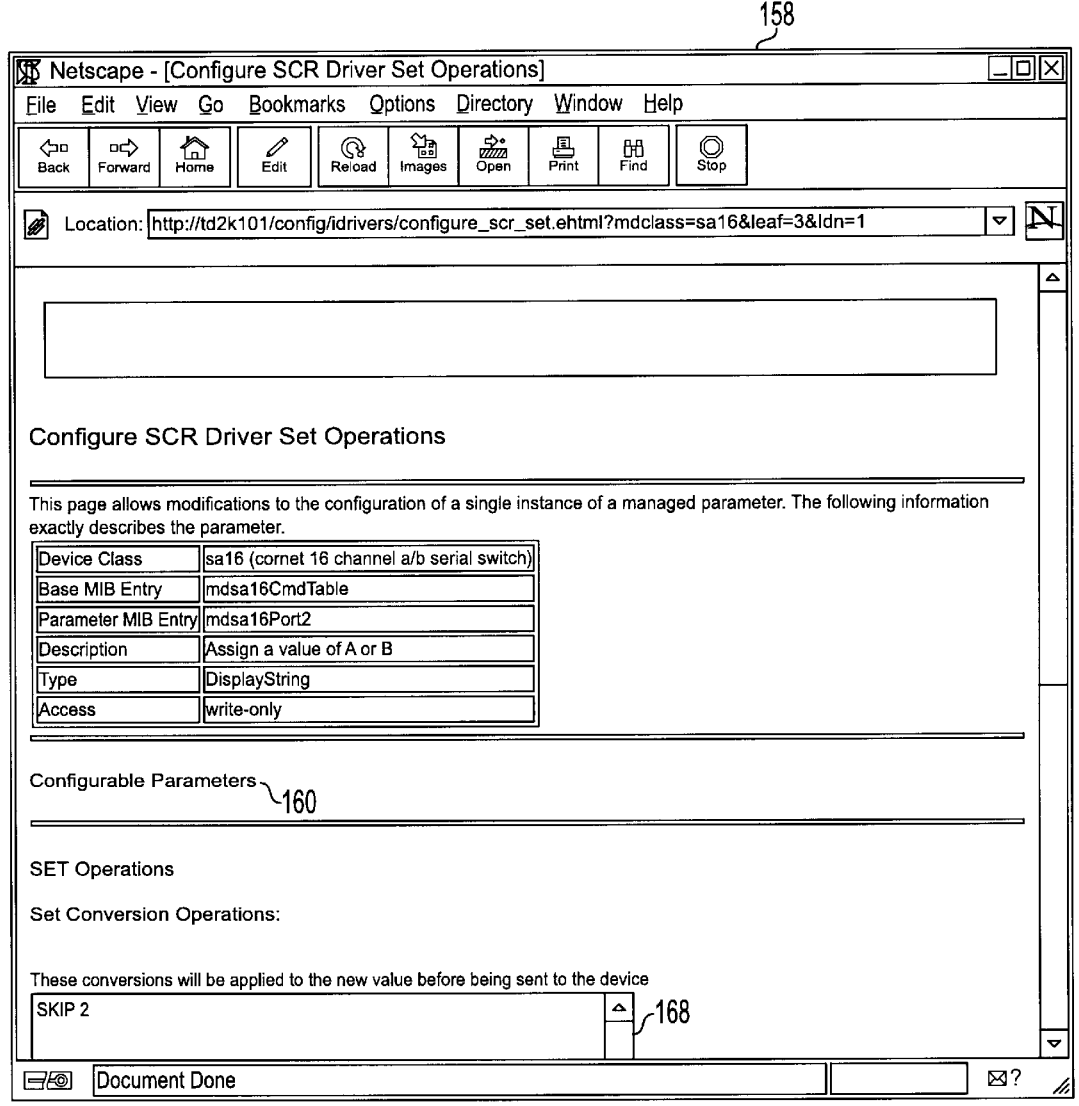

With continued reference to FIG. 13, the Get operations page 156 allows the user to construct the Get command for a given MIB variable. In the "Get Command" option 162 at the bottom of the page, the user can enter the native command string of the device (e.g., /S6xxxyyy). The time out value 164 indicates how long to wait for the response from the managed device. Reply length 166 is the total length of expected data in bytes. This does not include the reply terminator which is typically a carriage return (<\r>) followed by a new line (e.g., <\n>).

The Set conversion operations box 168 at the bottom of the page 158 illustrates how to associate a value to the MIB variable. A conversion operations page can subsequently be downloaded from the site server 12 to provide a library of common conversions that apply to string operations. In most cases, the string is data involved in the Get or Set operation. The conversion operation can also involve a series of conversions. Each conversion is applied in turn to the result of the previous conversion. The conversion process creates the values that are returned when Get and Set operations are invoked from the SNMP manager 20 using the device MIB. For example, a native device command can be "show config port 1". The string returned by the device can be specified as "baud rate 9600 parity none stop bytes 1". The MIB variable is specified as "GET baud_rate_port1". The conversion operation is denoted as a sub-string and the return to Get value is 9600. Thus, the data displayed on the SNMP manager would be "baud_rate; 9600".

Figure 15:
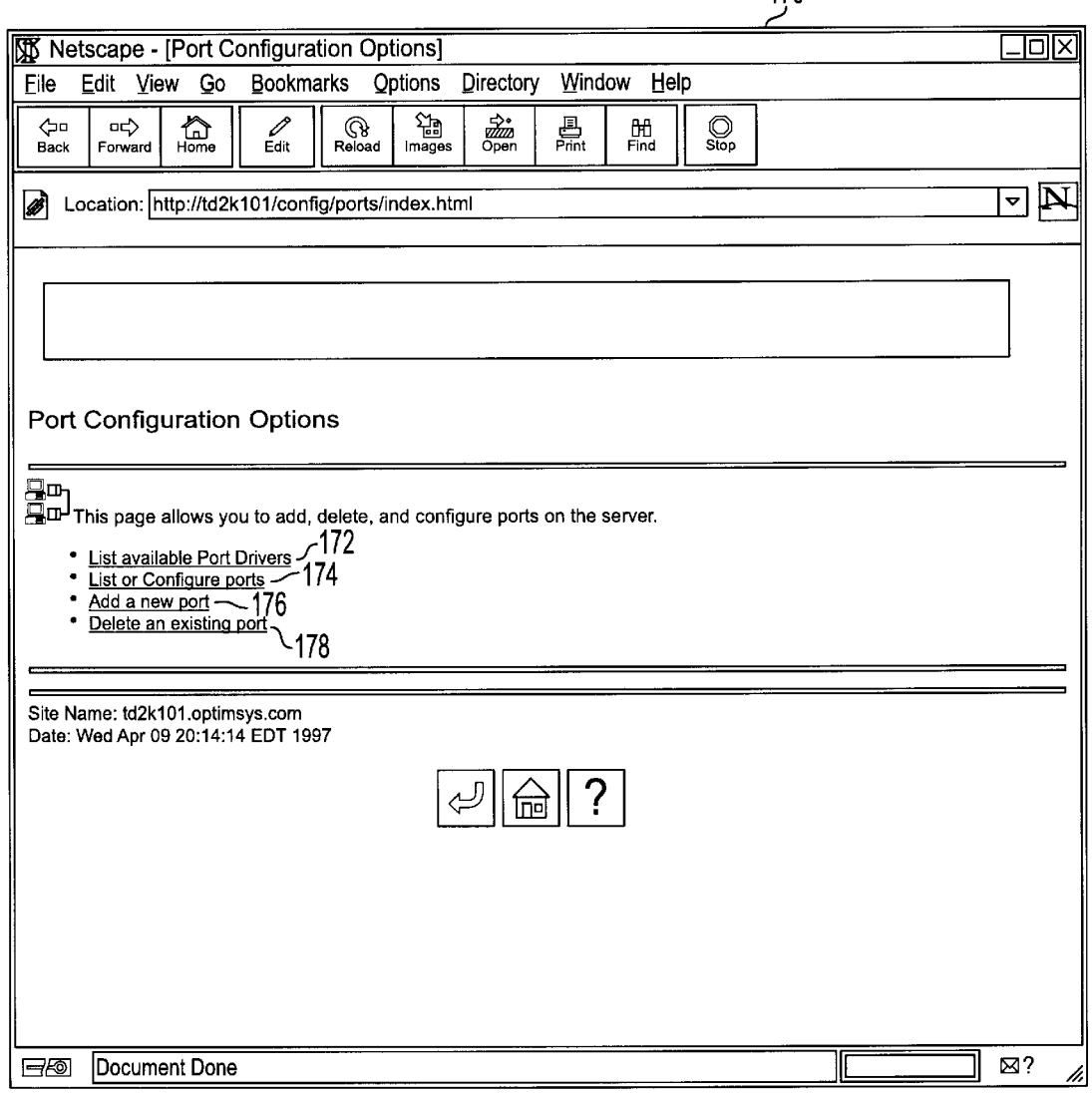
Figure 16:
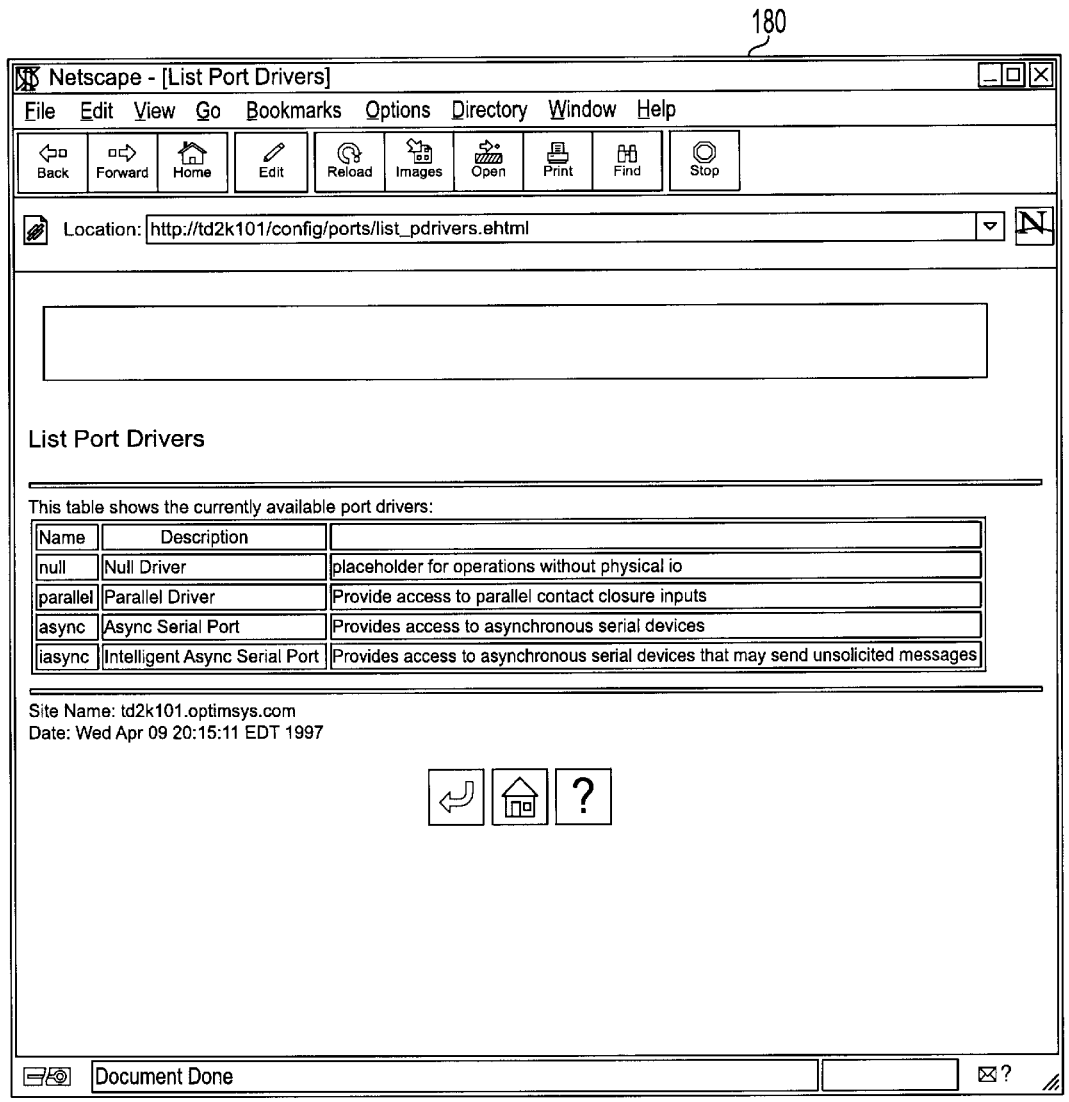
Figure 17:
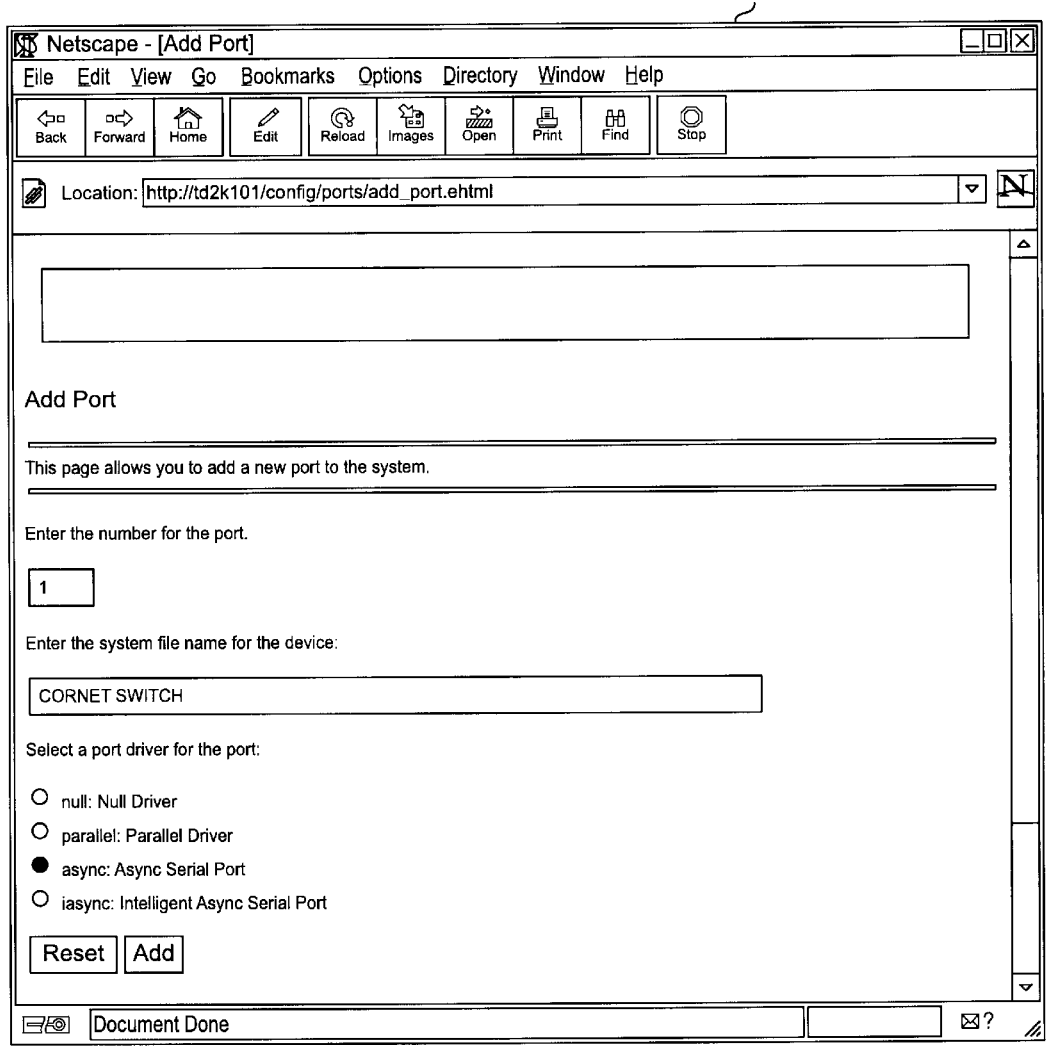

The port configuration page 170 (FIG. 15) permits a user to add, delete and configure ports on the site server 12. As shown in FIG. 15, the user can select one of a number of options 172, 174, 176 and 178, including listing available port drivers, listing and configuring ports, adding a new port and deleting an existing port, by way of an example. The page 180 in FIG. 16 lists the currently available physical port drivers 90 on the exemplary site server 12. Other port drivers 90 are available. Examples of port drivers 90 include, but are not limited to, an Async Serial driver, a Parallel driver and a Null driver. The Serial driver provides access to asynchronous serial devices operating in accordance with RS232, RS449 and RS485 standards. The Null driver provides a driver for operations without physical input and output. The Parallel driver provides access to contact closure inputs. Each driver 90 can be individually configured to reflect the settings required to communicate with a particular device being managed. To add a port, as illustrated on page 182 in FIG. 17, the port number and the port driver are specified to register the port (e.g., one of the ports indicated generally at 92, 94 or 96) with a site server 12. The port driver 90 is also selected for that particular port.

Figure 18:
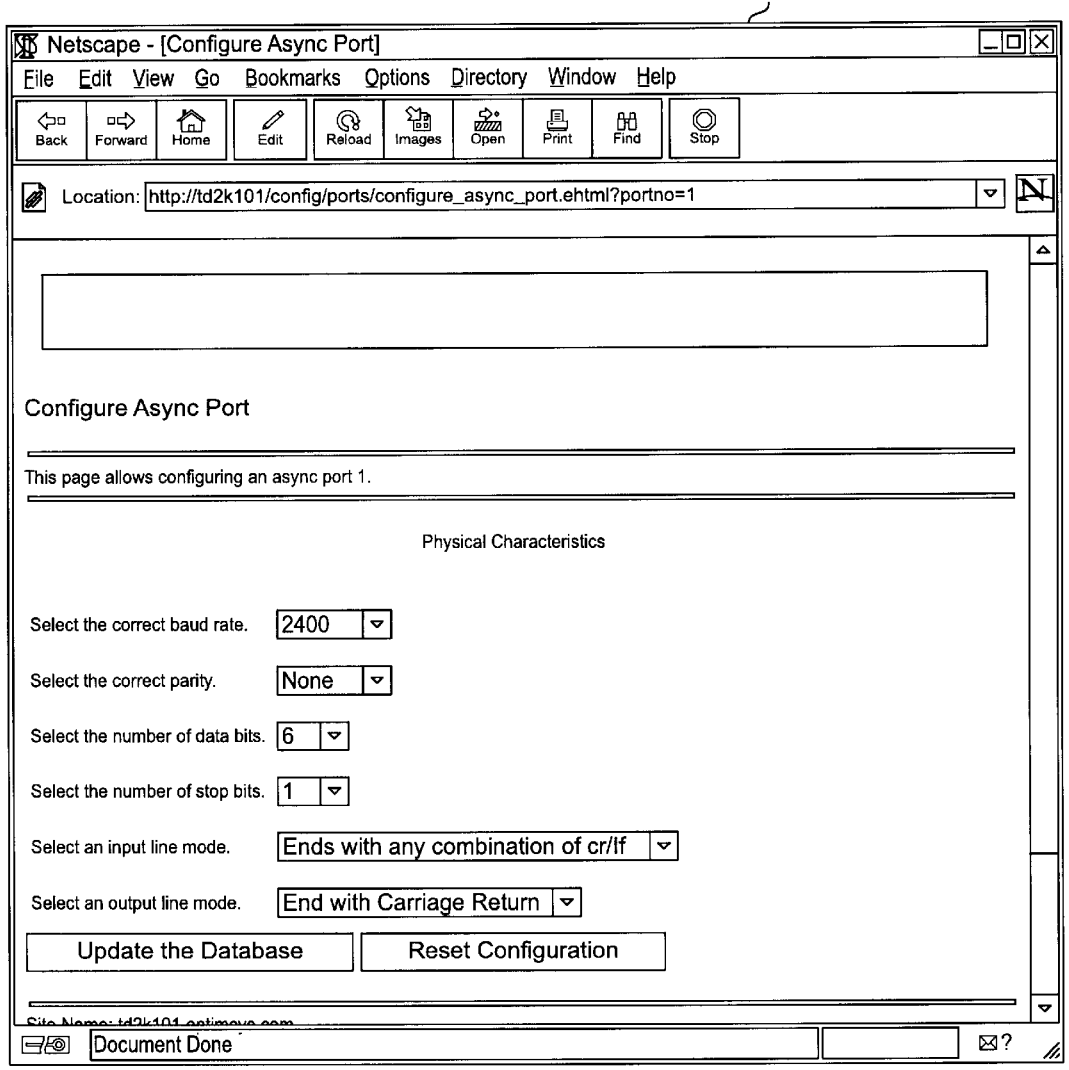
Figure 19:
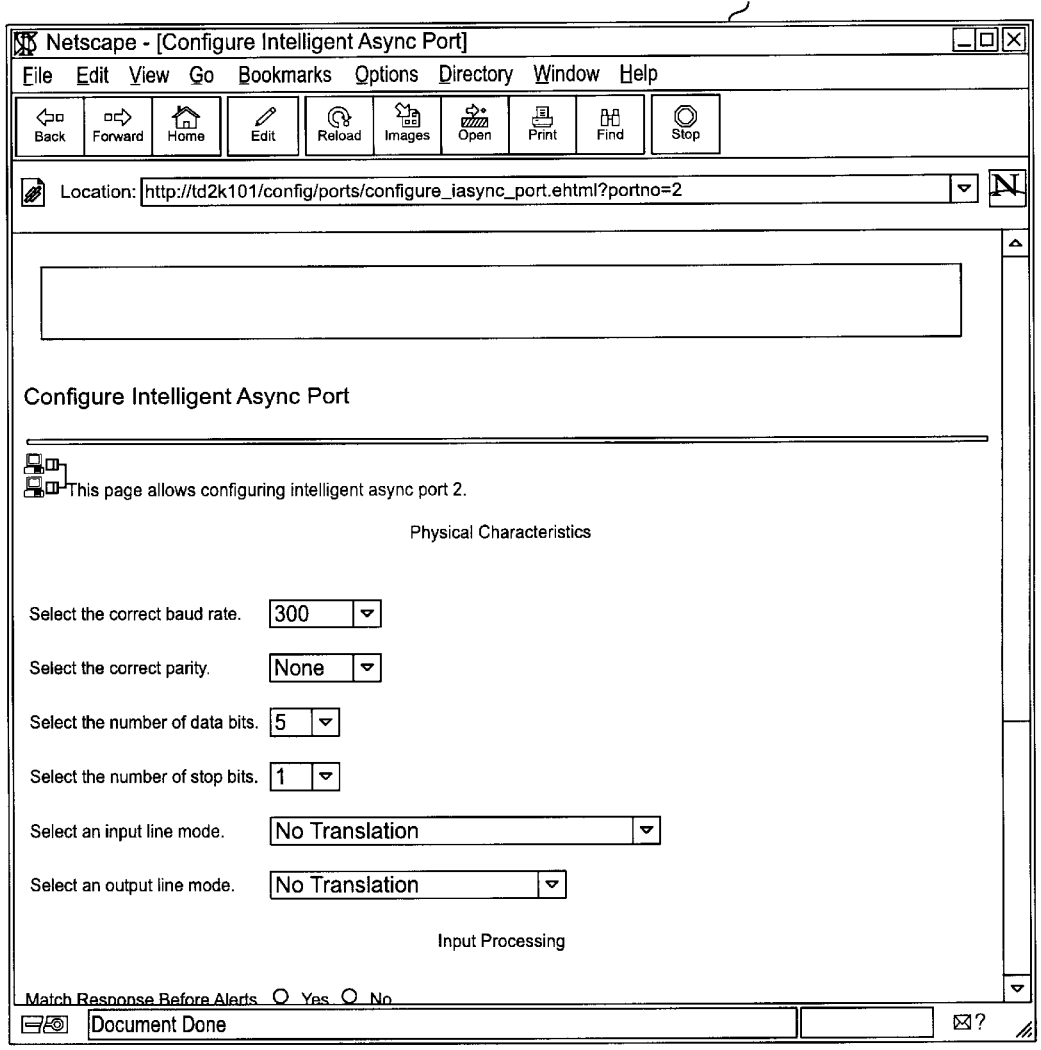

With reference to page 184 of FIG. 18, configure pages are available for each type of port. For illustrative purposes, a Configure Async Port page 184 is provided. As shown in the page 184, for asynchronous ports, standard parameters such as baud rate, parity, data bytes, the number of data bytes, the number of stop bytes, as well as input lint and output line modes, can be specified. Similar pages allow configuration of other port types. For example, page 186 in FIG. 19 illustrates configuration of an intelligent async port. The data entered in these pages is used by the port drivers 90 to establish communication with the managed device 14.

Figure 20:
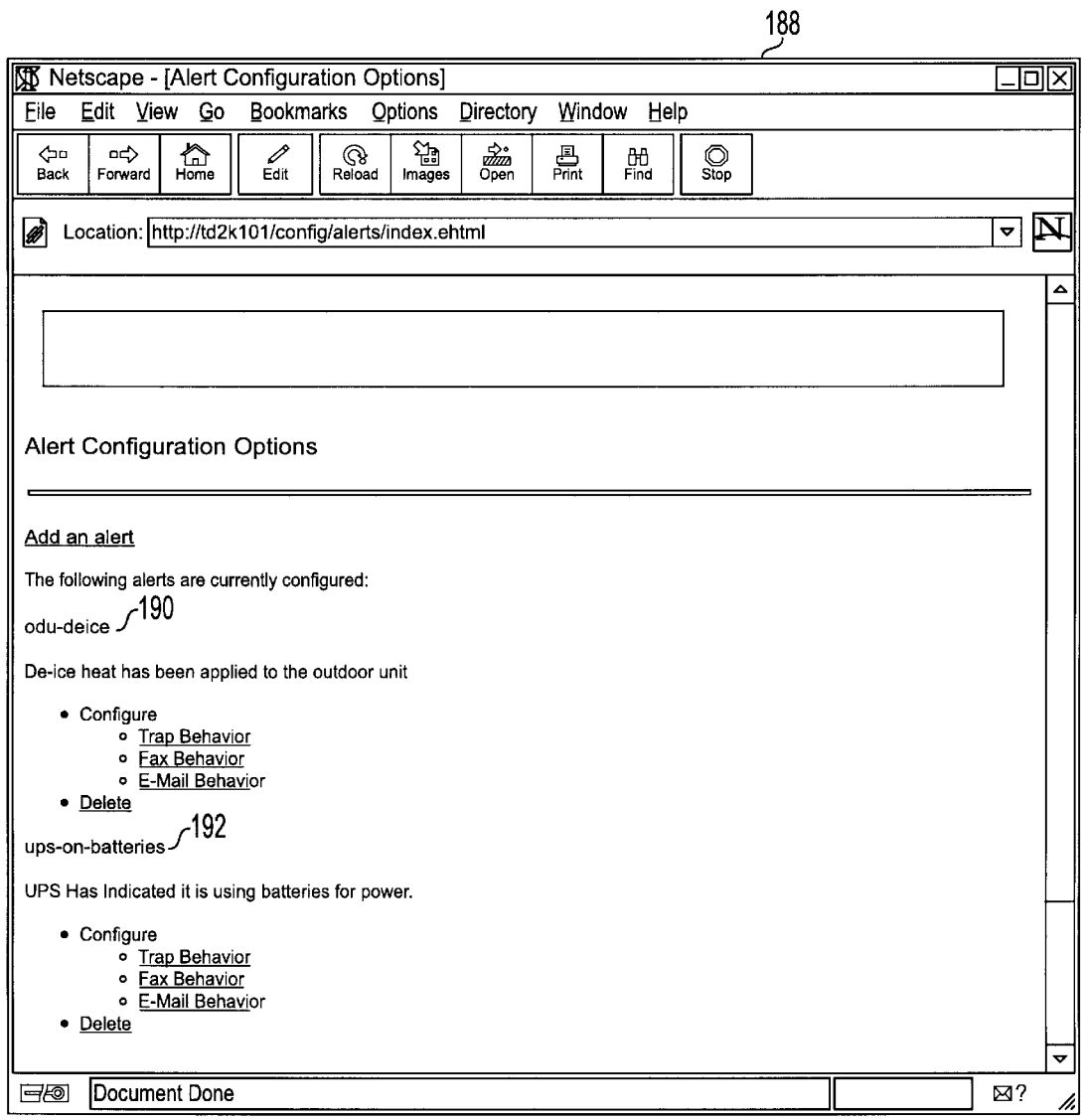
Figure 21:
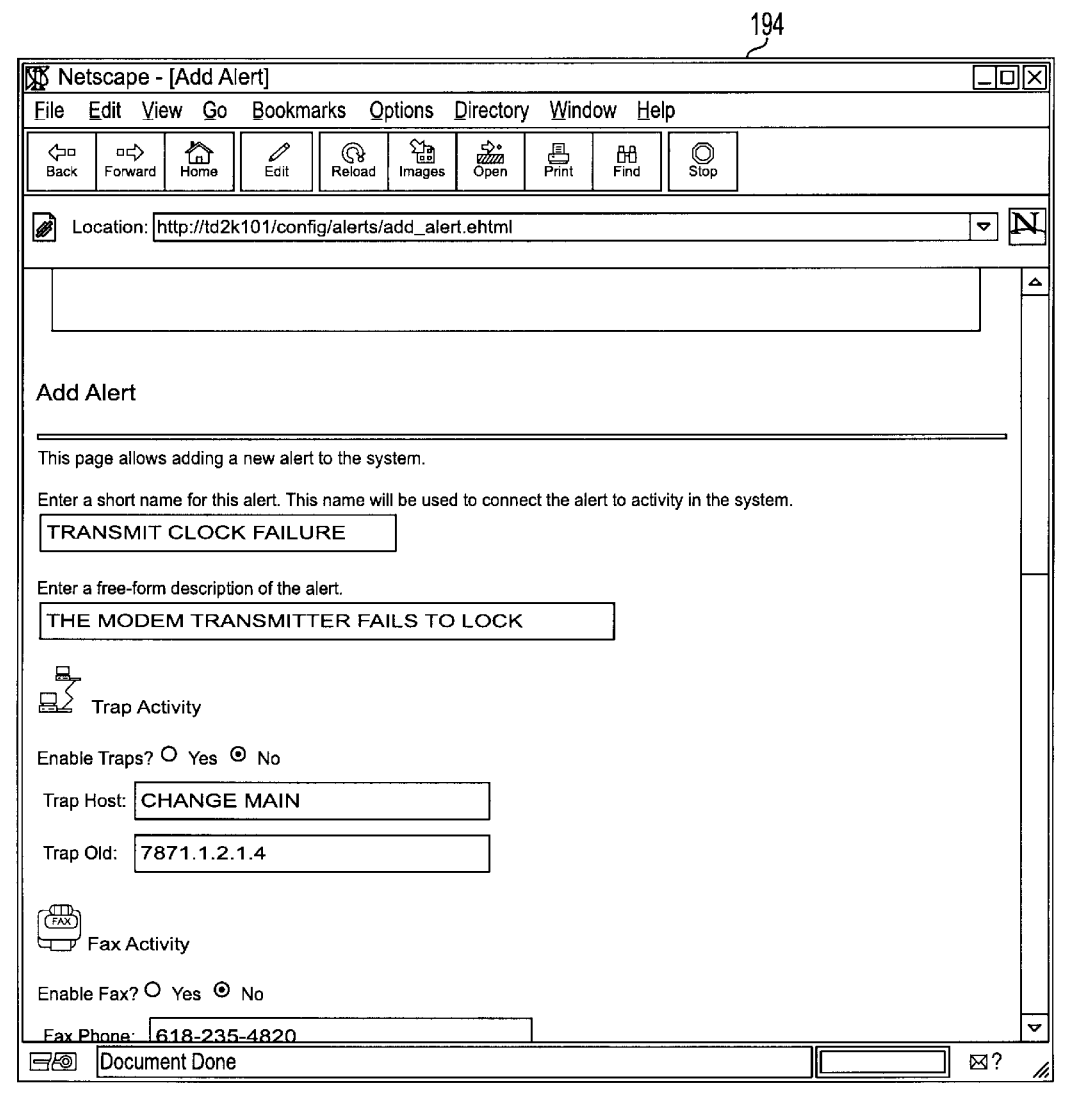
Figure 22:
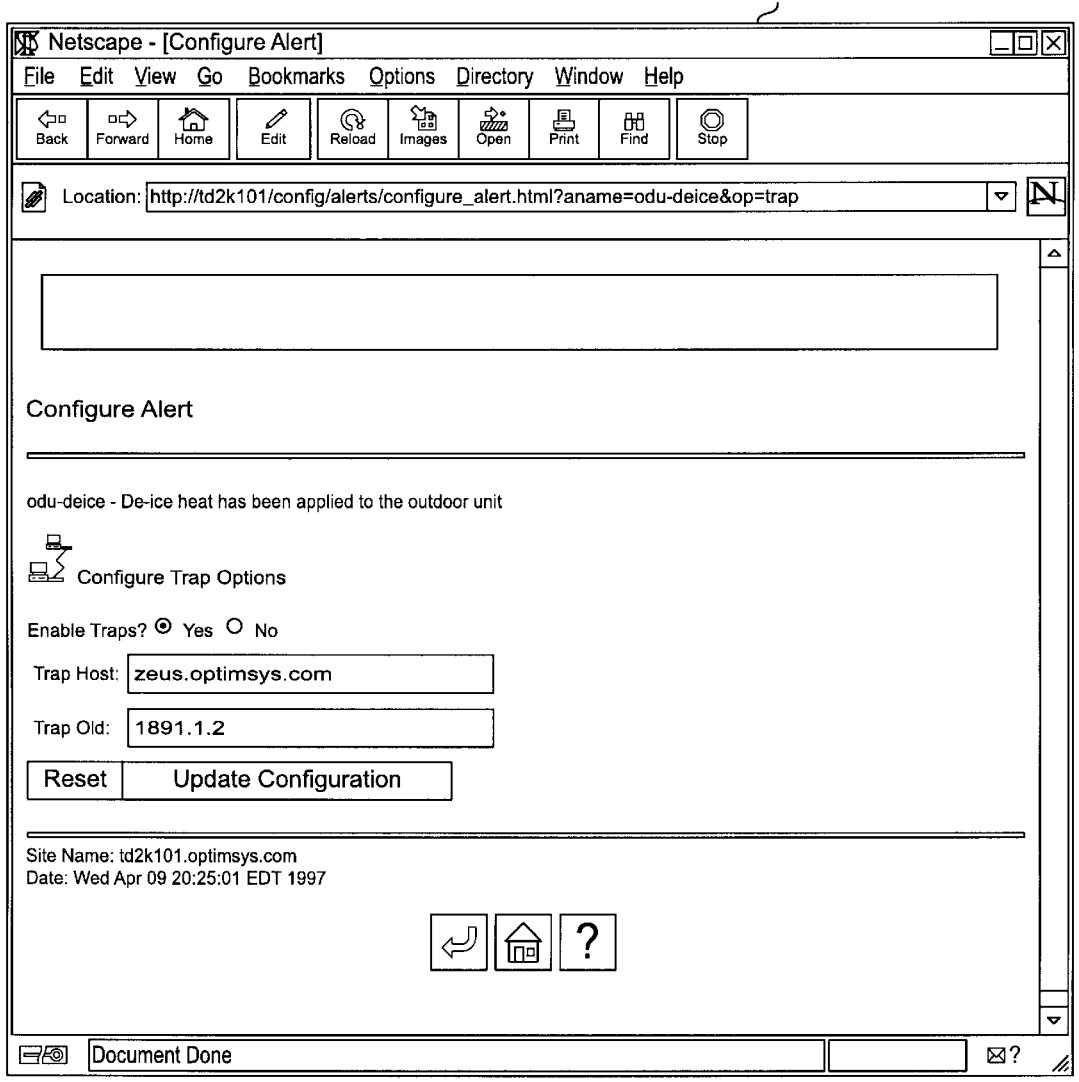
Figure 23:
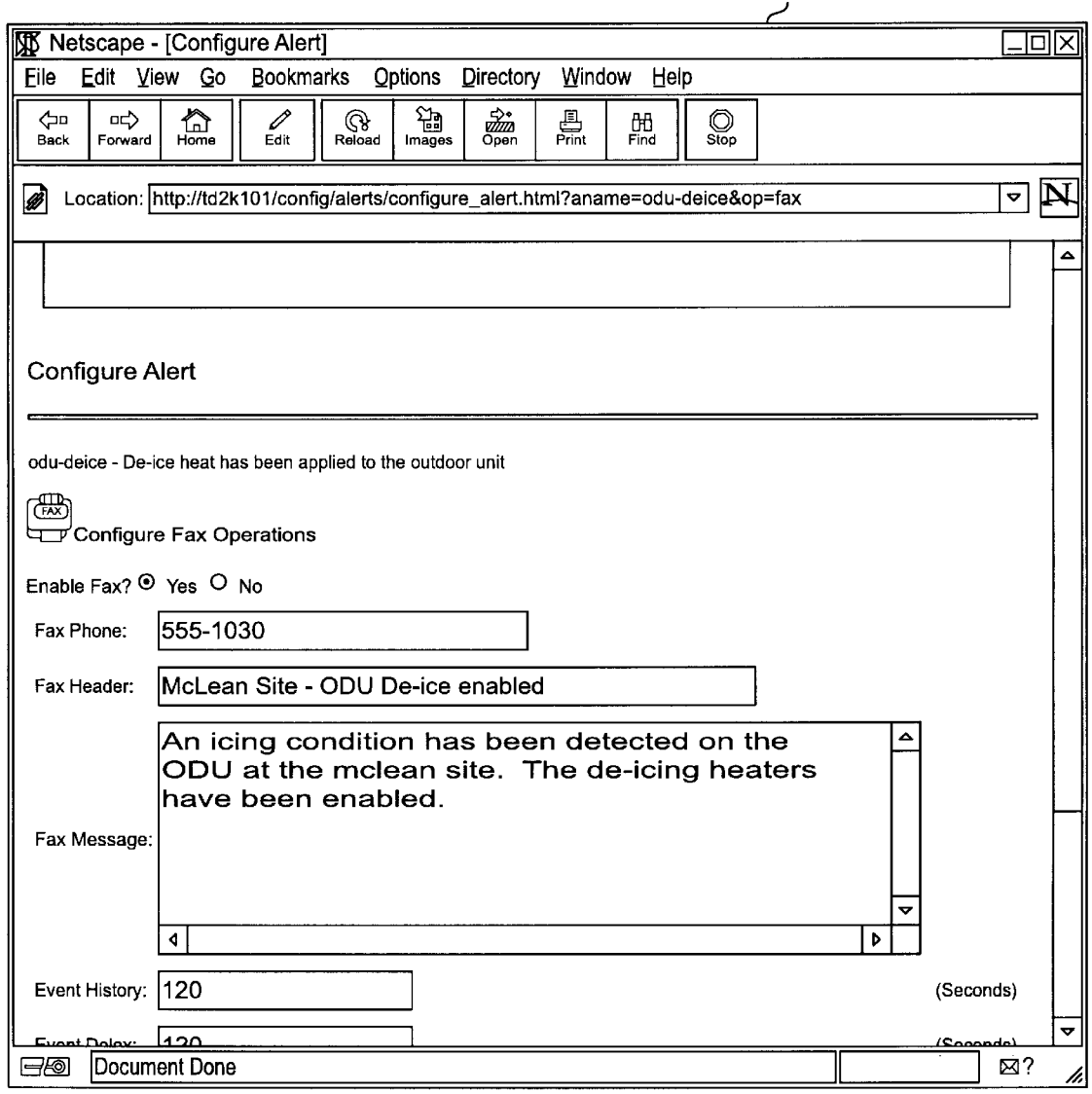
Figure 24:
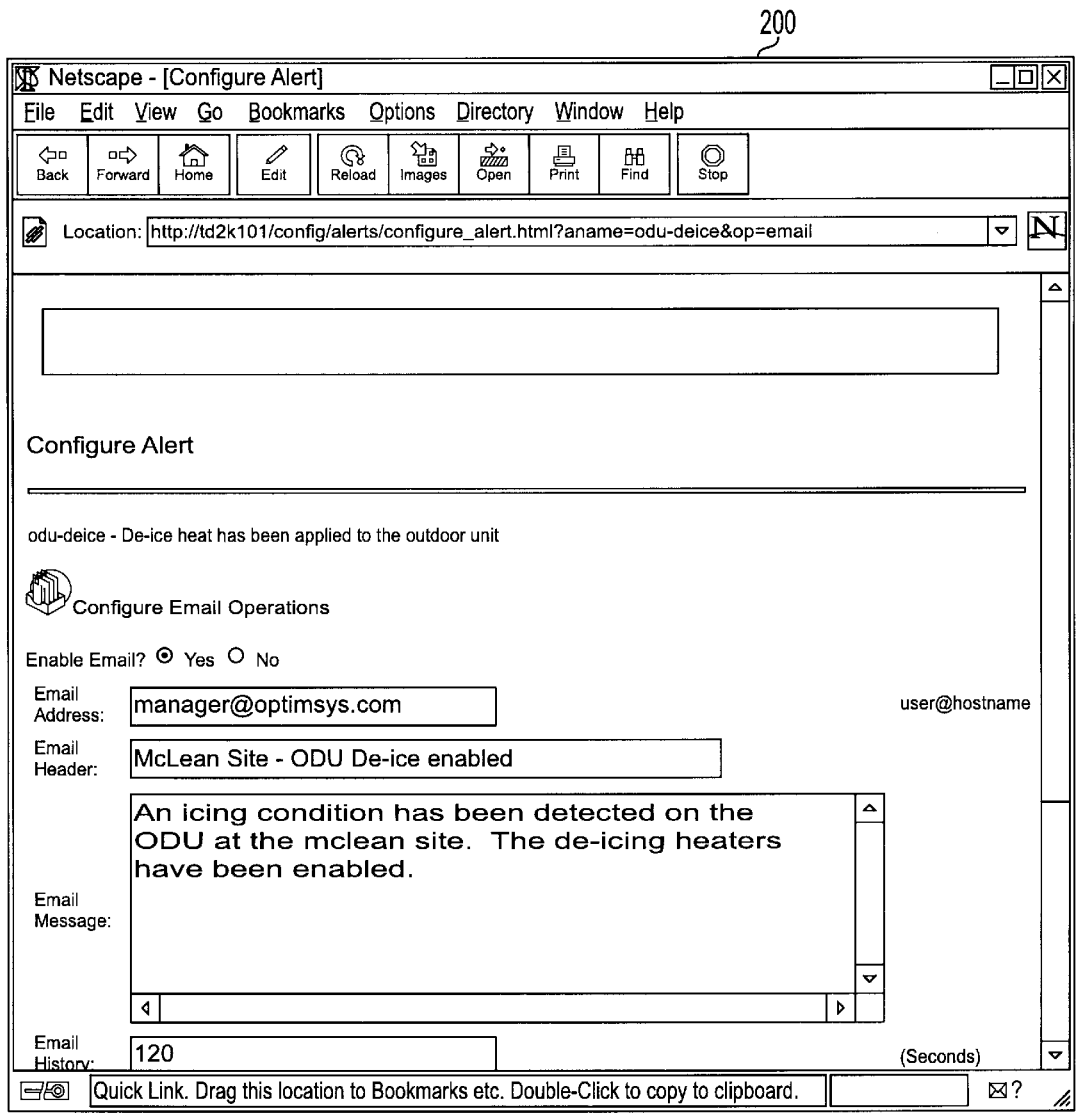

With reference to page 188 depicted in FIG. 20, some port types can be configured to match incoming patterns against known patterns to determine whether the incoming string is in response to a command, or is an unsolicited message describing a problem in the managed device. Thus, the site server 12 can be configured to monitor for alert conditions. If the pattern matches the pattern defined for an alert, an alert message is generated and processed by the site server 12 for sending a message to the SNMP manager 20. The page 188 permits alert configuration options to be selected by the user at a remote computer 58 during configuration of the site server 12. For illustrative purposes, two alerts 190 and 192 are indicated on the page. One alert 190 is for a de-icing unit. The other alert 192 is for an uninterrupted power supply (UPS) which has had to revert to battery back-up. In both instances, a user can indicate whether a Trap message is to be sent to the SNMP manager 20 (as indicated on page 1956 in FIG. 22), or a facsimile or e-mail message is to be generated and transmitted to a user at a remote computer 58 (as indicated on page 194 in FIG. 21), for example. Other alert messages can be specified using the page 194 indicated in FIG. 21. The user at the remote computer 58 is prompted to enter a short name for the alert message, as well as a description, and to select whether Trap or facsimile activity is desired. If a Trap message is to be generated upon occurrence of a particular event, the user is prompted to specify the Trap host and the host's OID (e.g., page 194). Similarly, if facsimile messaging is desired, the user is prompted to configure the site server 12 with the facsimile phone number of the recipient of the facsimile message. As indicated on page 198 (FIG. 23), the facsimile message can also be entered, as well as an e-mail message (e.g., page 200 in FIG. 24).

As indicated on the home page 100 (FIG. 4), an option is provided to the user for browsing the SNMP MIB database 72 at a site server 12. The browse utility permits the user to view individual device MIBs stored in the MIB 72. With reference to page 202 in FIG. 25, device MIBs are listed for various devices such as switches, routers, modems, multiplexers, home security devices, uninterrupted power supplies, transducers, home appliances and medical instruments. These device MIBs are listed for illustrative purposes and other device MIBs can be downloaded and listed on the browse page 202. Device MIBs can be public or private MIBs created by users or downloaded from the Internet from a number of commercially available MIB libraries and other resources, for example.

Figure 26:
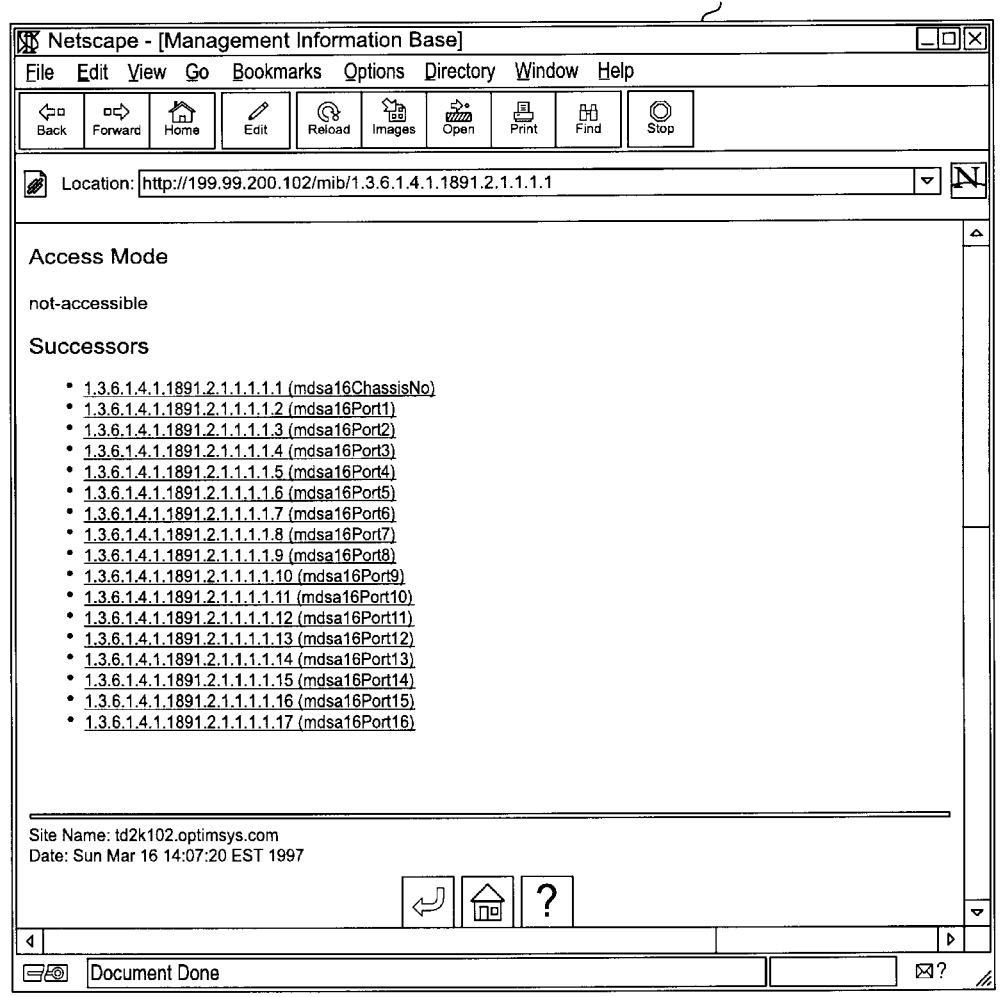
Figure 27:
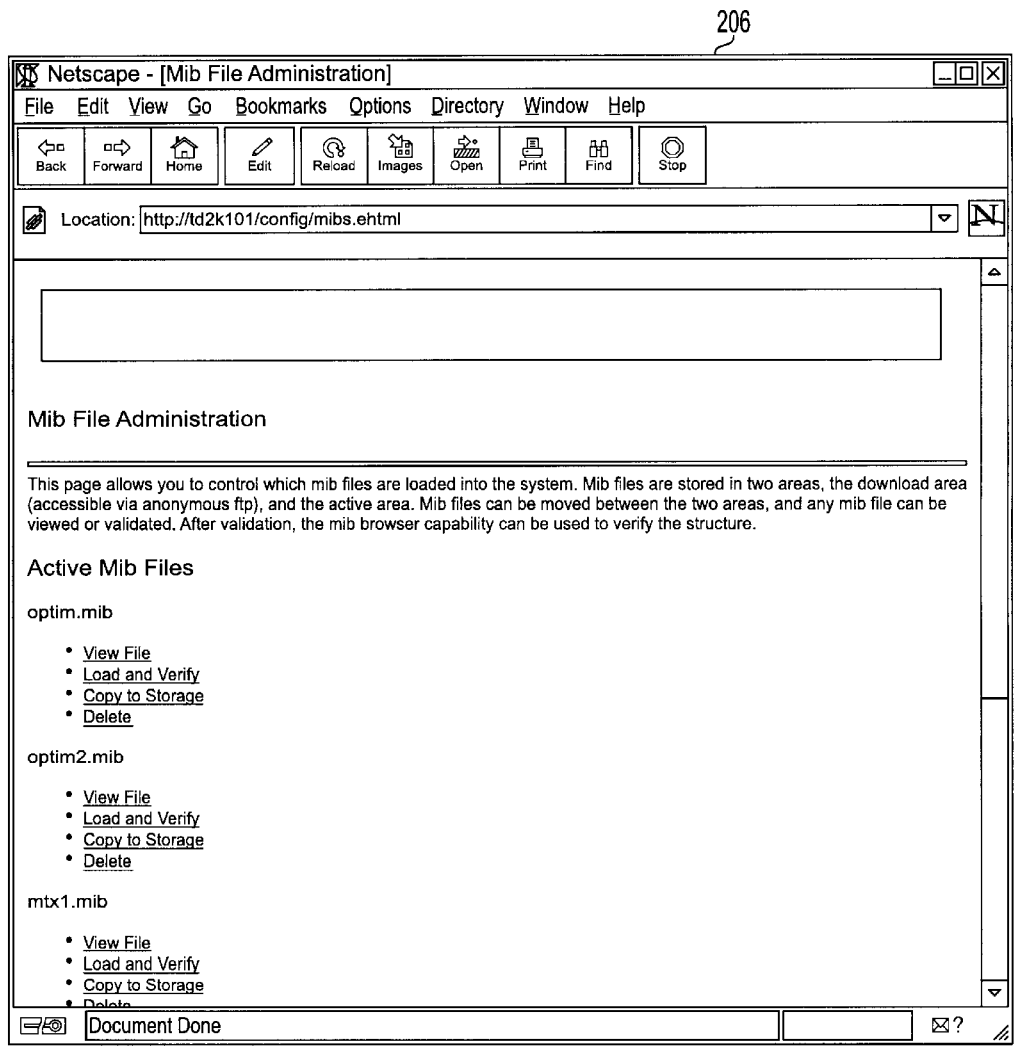
Figure 28:
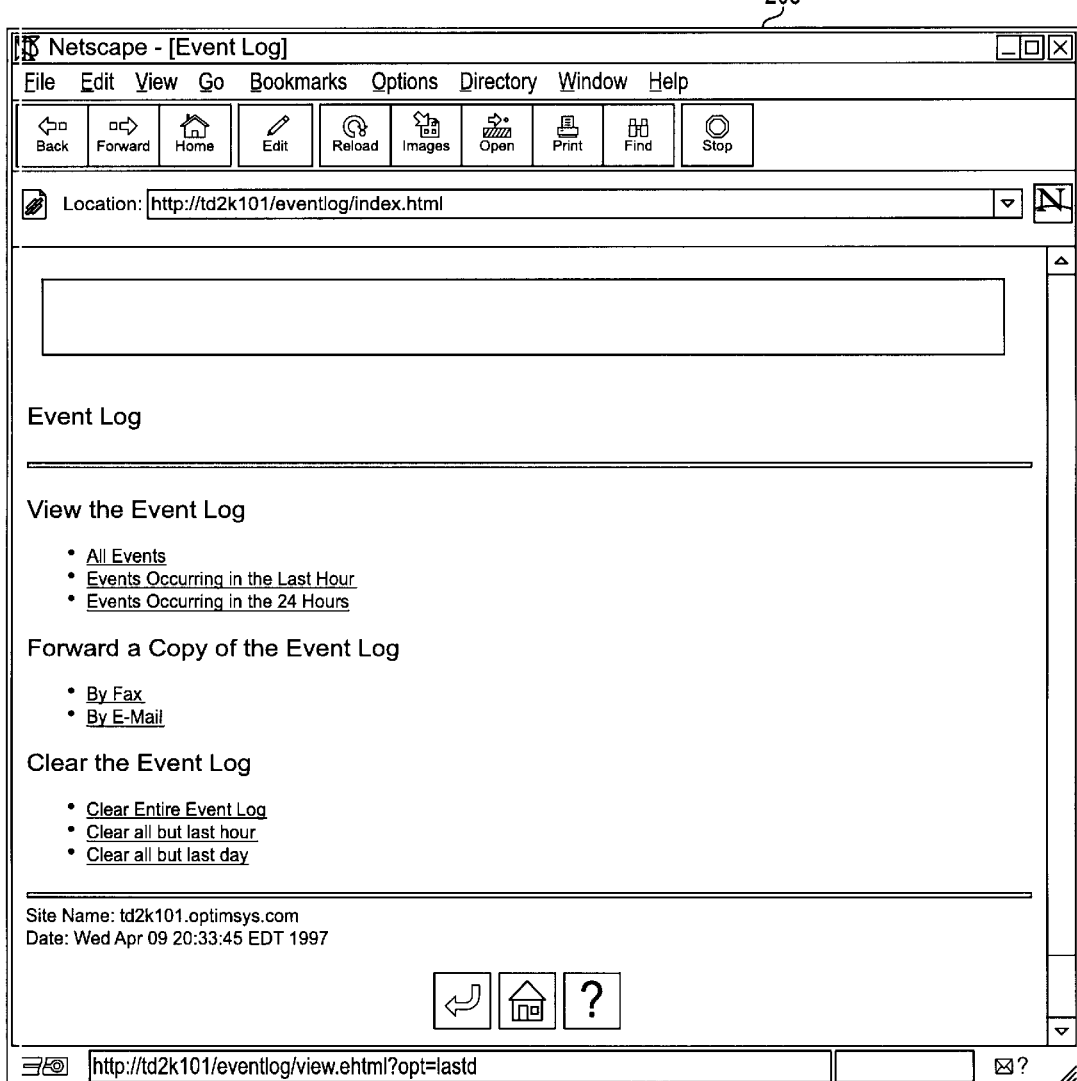
Figure 29:
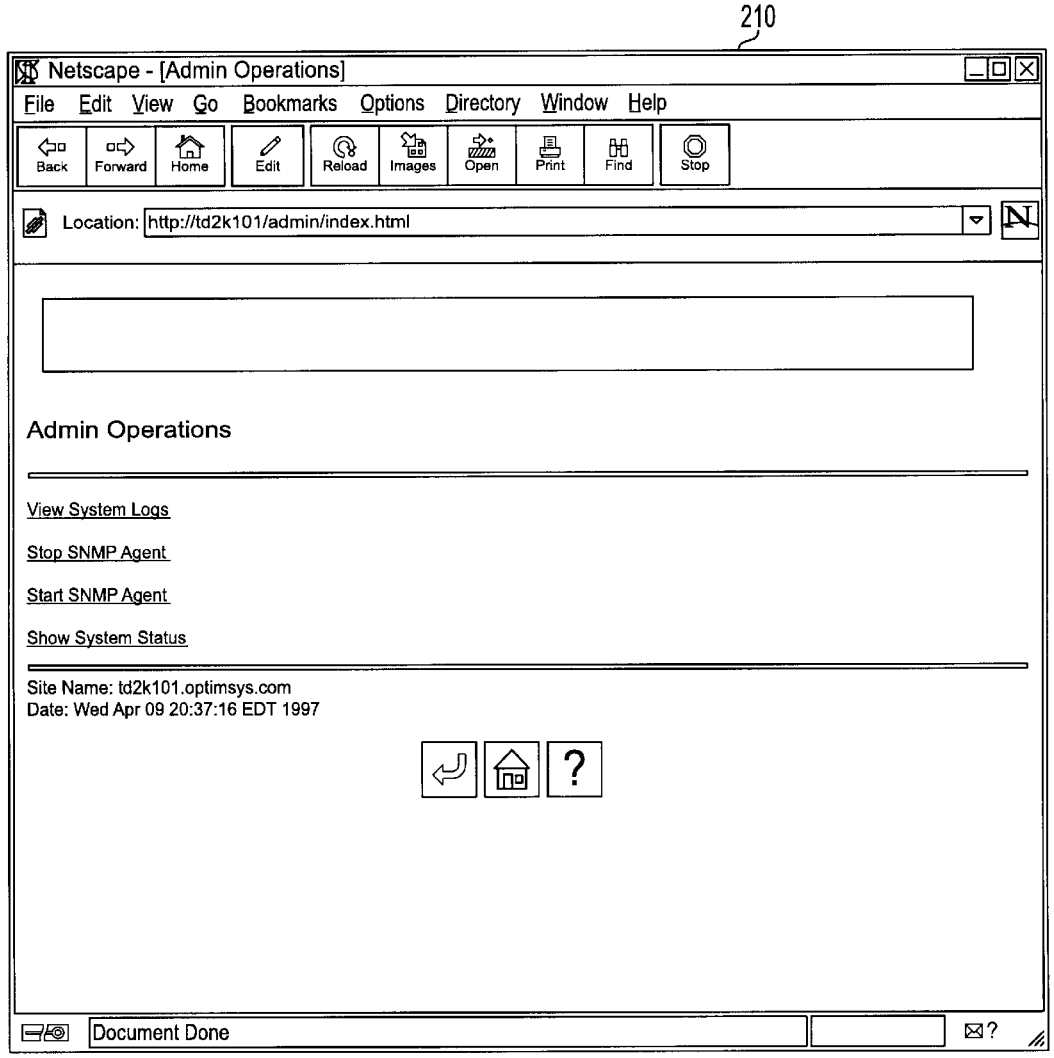

For example, using a mouse or other input device at the remote computer 58 to click on the "Switches" option on page 202 notifies the site server 12 to download a page 204, as shown in FIG. 26, which depicts a MIB for a SA-16 switch. MIB browsing is particularly useful for verifying the structure of a MIB visually. Page 206 in FIG. 27 illustrates a MIB File Administrator page to provide the user with options to view and control which files from the MIB 72 are loaded by the server 12. The creation of a device MIB will be described in further detail below.

The site server 12 is provided with event logging and reporting options. With reference to page 208 in FIG. 28, event logs can be viewed at a manager 18 or 20, or as a page downloaded from the site server 12 to the remote computer 58, transmitted via facsimile using the facsimile server 78 or by e-mail. The View option shows a time-ordered log of events from all managed devices. This feature allows automatic correlation of all events occurring at a given site. Events are forwarded to the SNMP manager 20 unless otherwise filtered per the configuration of the user. Events are stored in the relational database 80 in such a way as to permit flexibility to manipulate events data, to create custom reports and reporting features.

Device MIBs in the MIB database 72 are developed for managed devices 14 based on commands, responses and alarms characterizing the devices 14. Once developed, the device MIB is loaded into the SNMP manager 20. The device MIB is preferably tested with the device 14 to be managed in a laboratory environment and then downloaded after testing to site servers 12 using Web-driven procedures. As stated previously, Web files are preferably created for each MIB table. The device MIB file is subsequently copied to the site server 12 using File Transfer Protocol (FTP). Verification that the device MIB has been loaded to the site server 12 is available through administrative options 108 in the Web page 100 described above in connection with the configuration process. Exemplary administrative options are shown on page 210 of FIG. 29. These include viewing system logs, stopping and starting the SNMP agent 82 and showing system status. As stated previously, the site server 12 is programmed to download device MIBs corresponding to devices 14 connected to its ports indicated generally at 92, 94 and 96 on an as-needed basis. Accordingly, a new MIB is downloaded into an active area of memory space if needed for a particular device 14 connected to a port of the site server 12. The NMP agent 82 is subsequently restarted.

As illustrated by the above described pages (FIGS. 4–28) used for configuring a site server 12, the site server 12 provides services to different types of managed devices 14 and can be readily connected to these devices 14 using serial, analog or contact closure interfaces. Further, the server can be configured to communicate with the device 14 in the device's native protocol and format. Thus, the site server 12 is a universal management platform for devices 14 which were previously unmanageable, and unifies management functions of devices 14 that may have been managed by various proprietary management systems. The MIB 72 links proprietary devices 14 to standards in order to make the site server 12 a universal management platform. As stated previously, the MIB 72 is the description of a managed device 14 through its parameters, commands, response and alarms formatted in a standards-prescribed manner. A device MIB, once designed, is preferably distributed to an SNMP manager 20, as well as to the managed device agent 82, that is, the site server 12 to which the device 14 is connected. This allows the manager 18 or 20 or the site server 12 to communicate and exchange information about the managed device.

To design a device MIB, as opposed to downloading an existing device MIB from the Internet or other source, a system engineer examines the device 14 to be managed to determine the critical aspects of the device. The native management interface of the device 14 to be managed is studied to determine the formats, parameters, commands, responses and unsolicited alarms that characterize the device. A concise table summary of the device MIB is subsequently created using object-oriented design. By way of an example, an SA-16 electronic A/B switch can be controlled using the site server 12 using the ASCII terminal of the switch. The SA-16 switch interface was previously not capable of incorporating an SNMP agent 82 until the advent of the present invention. The native management interface of the SA-16 switch has an ASCII command/response interface with no unsolicited events or alarms coming from the switch itself. The interface is indicated in Table 1.

TABLE 1

| /S6NNCCF[/]<cr> | |
|---|---|
| /S6 | Fixed starting header |
| NN | The box number |
| CC | The channel or port number |
| F | The function or command word |
| /<cr> | Fixed trailer |
| Commands (field F) | |
| A | Switch a channel to "A" |
| B | Switch a channel to "B" |
| D | Disable front panel switches |
| E | Enable front panel switches |
| M | Mask off the lead control |
| U | Unmask lead control |
| L | Monitor channel onto bus |
| R | Remove a channel from a bus |
| C | Break DCE of channel onto bus |
| T | Break DTE of channel onto bus |
| S | Request status of a box |

The 11 commands in Table 1 are subsequently mapped into two primarily objects or parameters, as shown in Table 2.

In accordance with another aspect of the present invention, software is available from the site server 12 to guide a system operator or user in the design of a device MIB. The software helps with the mapping of commands (e.g., GET and SET) to objects or parameters to obtain the information in Table 2. Table 2 is subsequently transformed into a device MIB. The SA-16 switch interface is enhanced by the site server 12 of the present invention in that the site server 12 allows a user at a remote computer to query the status of one port only. The site server 12 permits a port parameter or object defined in the MIB as a Write and Read parameter corresponding to the SNMP Set and Get operations. The values to Write are commands shown in the first row of Table 2. The parameter value to Get is the status of the port connected to A or B.

TABLE 2

| | Object | Operation | Send | Expect |
|---|---|---|---|---|
| 1 | Port | A: switch to A | Set | Fixed format | Nothing |
| | | B: switch to B | Set | | |
| | | D: disable front panel switch | Set | | |
| | | E: enable front panel switch | Set | | |
| | | M: mask off lead control | Set | | |

TABLE 2-continued

| | Object | Operation | Send | Expect |
|---|---|---|---|---|
| | | U: unmask lead control | Set | | |
| | | L: place a port on the monitor bus | Set | | |
| | | R: remove a port from the monitor bus | Set | | |
| | | C: break DCE of a port on to the bus | Set | | |
| | | T: break DTE of a port on to the bus | Set | | |
| 2 | Box | S: request status of the box | Get | Fixed format | ASCII string with status of all switches |

For illustrative purposes, the process of performing a SNMP Get operation using a site server 12 will now be described with reference to FIG. 30. The SNMP engine 82 receives a MIB parameter 212 from a MIB table corresponding to a device 14 that is being managed. Once the configuration process described above is complete, the site server 12 is programmed to bind variables in the scripting language to specific MIB instances in accordance with the configuration as specified for a particular device 14. When processing a MIB parameter, therefore, the SNMP engine 84 is programmed to bind the parameter to a specific MIB instance in a MIB table, as indicated at 214. The SNMP agent 82, therefore, knows where to obtain a value, for instance. The SNMP engine 84 then obtains the call-back function from the appropriate MIB sub-tree, as indicated at 216. The SNMP engine 84, therefore, knows which procedure to execute during processing of the SNMP Get operation. As stated previously, for Get operations, the call-back procedures are run before the SNMP engine 84 reads the value from the variable. The SNMP engine 84 subsequently consults an instrumentation driver 88 and a port driver 90 specified for the device 14 during the configuration process. Thus, the Get command is placed in a native protocol and format that can be understood by the device connected to the port, and the SNMP engine 84 can understand data received from the device.

Figure 30:
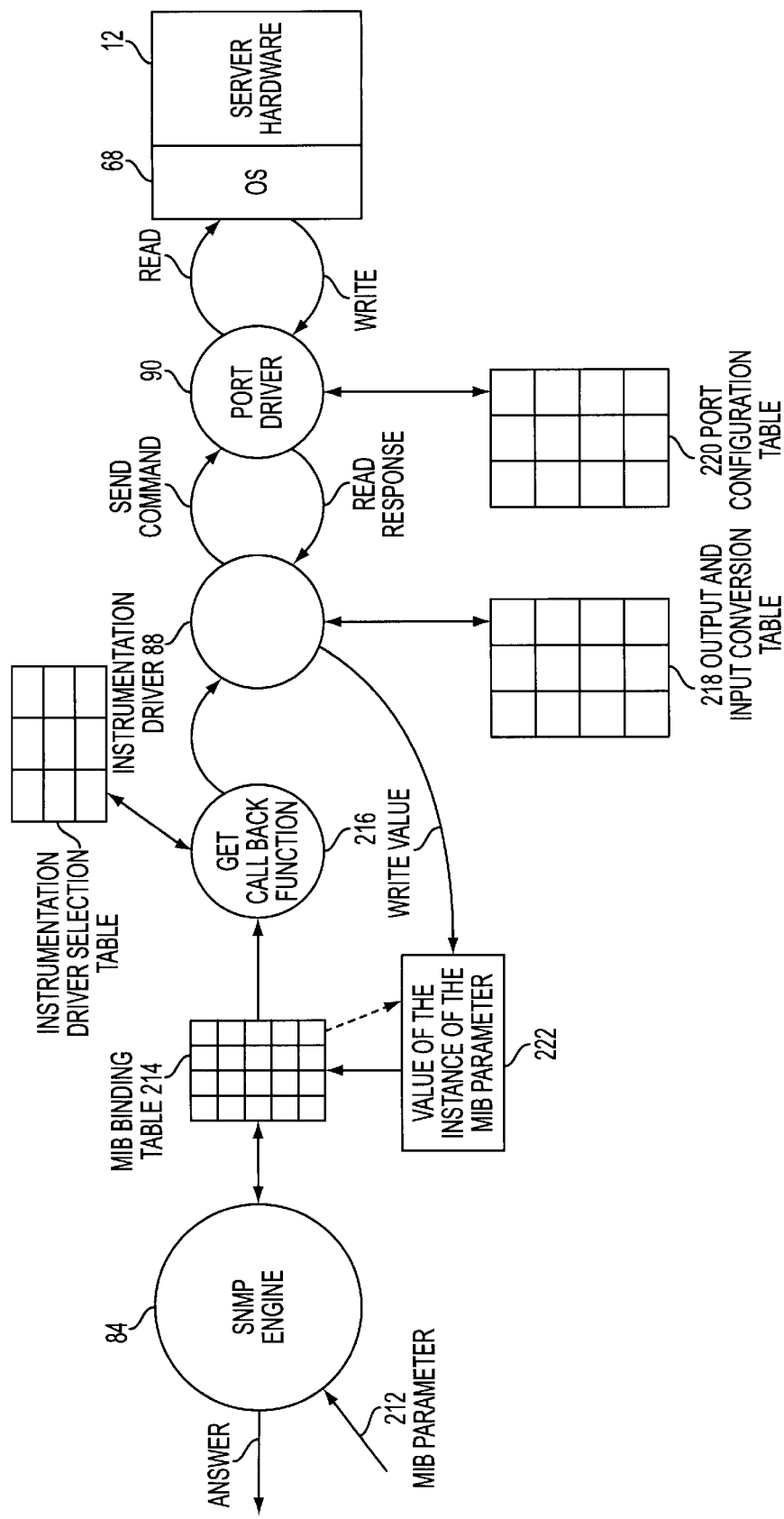
FIG. 30 is a diagrammatic illustration of a method for interpreting a MIB parameter from a MIB file corresponding to a device undergoing a management operation into a native interface operation of the device.

With continued reference to FIG. 30, the input/output conversion tables 218 with the instrumentation drivers and the port configuration table 220 are used by the SNMP engine 84 to read the response from the device 14 and to write the requested value as the value of the instance of the MIB parameter 222, which is sent to the SNMP manager 20 in response to the SNMP Get command. Thus, the SNMP agent 82 handles all aspects of SNMP operations. For example, for a Get operation, the SNMP agent executes the call-back function, that is, communicates with the managed device to determine the value of the desired MIB parameter and sets the bound variable, accordingly. The SNMP agent extracts and formats the new value from the bound variable and properly encodes the response to the SNMP manager 20. For a Set operation, the SNMP agent 82 first sets the bound variable to the new value and then calls the call-back function. The call-back function subsequently examines the new value of the bound variable and sends the necessary commands too the managed device to cause the change to occur.

In many devices, a single command can set multiple inter-related parameters in the managed device 14 in accordance with another aspect of the invention. For example, a satellite radio transmitter can be configured to use the correct frequency, modulation method, error correcting code and transmit power with a single command. The site server 12 of the present invention supports combining a group of parameters together and use of only one Set operation to send the command to the device 14. Thus, the SNMP variables for frequency, modulation method and error correcting code do not update the device 14 when set. When the last parameter, that is, the parameter actually configured to update the device as set, the site server 12 gathers all of the associated parameters and aggregates them into a single command.

In accordance with another aspect of the present invention, many parameters can be returned in a single response. A number of devices return information about many parameters in a single response. For example, a multi-channel RS-232 switch can return a single line with the settings of all of the switches of all the channels when the switch is queried for status information. In existing management systems, SNMP managers poll every parameter associated with the device and, accordingly, make a request for each channel, even though the necessary information had been extracted when status is read from the device the first time. The site server 12 of the present invention minimizes redundant commands to and responses from the device 14 by grouping related parameters to share a common response in a response cache. The response cache stores the most recent response from the device. When the SNMP Get command is executed, before sending a command to the device and reading the response, the SNMP engine 84 is programmed to check the response cache to see if a valid response exists for this set of parameters. If a valid response is available, the string is used rather than requesting another response string from the device. The cache maintains a time-out for each parameter which is preferably five seconds.

The site server 12 of the present invention permits customers to build a universal, standards-based device management system for all of their equipment at all equipment sites. Customers are able to integrate essentially any device into the standards-based management system without (e.g., an SNMP-based management system) device-based software development. The site server 12 is designed for customers with legacy, previously unmanaged, as well as well-managed devices at hub and remote sites. The site server 12 is particularly well suited for sites with multi-vendor equipment. The site server 12 is cost effective for customers with sites having large numbers of legacy devices that are critical to customer operations and had been previously unmanageable from an SNMP manager. customers manage legacy devices by configuring SNMP or other standards-based MIBs for the managed devices. Once the MIBs are downloaded, the site server 12 is accessed through the customer's intranet or directly via dialogue for configuration purposes. Due to the flexible architecture of the site server, the site server 12 permits direct dial through PSTN, intranet and Internet connections. Further, different ports are accommodated permitting contact closure interfaces, as well as serial and analog ports to be used to connect devices to the site server. The site server 12 can secure access to the managed devices in a plurality of ways, including log-in and passwords for system operation via the Web browser, authorization of outbound connections, including CHAP/PAP, authorization of inbound connections to the network operations center, as well as restriction of user access to commands and functions. Security tracing is available via event logging.

The site server 12 of the present invention stores events, alarms and status information in the database 80. The events are preferably stored in a revolving disc with large capacity. Intelligent event handling functionality supports a number of levels of user-defined processing, including queries, last number of events retrieval, time-based events, event triggered reports, and so on. Events can also be defined for scheduled site visits to check communication links and other aspects of the site server.

The site server architecture is flexible and allows adaptation to new devices by downloading custom drivers. Drivers available in the site server include, but are not limited to, common serial command and control interfaces, contact closure sensing interfaces, full-screen format interfaces, as well as video and analog inputs.

The integrated site server 12 of the present invention is a universal remote access device management solution which is standards-based, scaleable and offers network managers the flexibility to easily configure and manage remote sites and integrate popular SNMP and WEB managers, such as HP OpenView, Sunnet Manager and others. Thus, organizations can protect investment in current installations and leverage open technologies that can be integrated with existing systems. The integrated site server 12 also allows the organization to choose among many products and vendors for the most appropriate implementation. The ease with which open technologies can be incorporated into both present and future systems permits more effective planning information technology growth.

The integration and optimization of proprietary device management with standard management platforms using the integrated site server 12 provides consolidated control of hubs, switches, routers and network access servers and virtually any device from a single point of management. This level of integration provides network managers with the means to troubleshoot, configure, monitor, analyze and baseline both their backbone network and remote nodes from a common application. Thus, the present invention can ease set-up and configuration of devices, giving organizations an effective tool for managing growing networks and for containing costs.

The integrated site server 12 of the present invention provides a universal device management architecture which enables non-networkable devices, legacy devices, non-data devices, and virtually any device to be integrated into a common standards based, WEB-driven management paradigm with essentially unlimited application possibilities.

The integrated site server 12 reduces the cost of network ownership by providing simpler, more powerful network interfaces for setting up proprietary devices and configuring device parameters. For example, simple web pages provide users with little experience in setting up and configuring remote access devices a time-saving and economical way of installing and maintaining systems. A user-friendly series of sequential pages prompt the user, making SNMP or other standards-based device management protocol configuration set-up transparent. The user of browser technology at the computer 58 provides a consistent, point-and-click interface which makes access simple for users, regardless of their expertise, and eliminates having to know the command line parameters of the device. Configuration management is further simplified by the intuitive nature of the browser interface which is driven by a library of common configuration parameters that can be applied globally or selectively.

In addition, both in-band and out-of-band management is supported through multiple communication channels to enable management virtually anytime and from virtually any location. The need for the device expert to be physically present onsite to help configure the management system to manage the device is no longer necessary. The web capabilities of the present invention provides the device expert and the operator with a new paradigm shift, that is, the device and the user remain stationary and data for management travels. The physical collocation of the operator and the management console is no longer required. The ability for the device vendor experts to directly access the device from a web browser to jointly troubleshoot with the customer is a unique opportunity for cooperative and cost-effective problem resolution. Further, the ability to access a device for real-time monitoring and troubleshooting from a web browser is a powerful way to manage global-networked devices.

Although the present invention has been described with reference to a preferred embodiment thereof, it will be understood that the invention is not limited to the details thereof. Various substitutions and modifications have been suggested in the foregoing description, and others will occur to those of ordinary skill in the art. All such substitutions and modifications are intended to be embraced within the scope of the invention as defined in the appended claims.

What is claimed is:

1. A universal device management communication interface comprising: at least one port for connecting to a legacy device, said legacy device being characterized as using a proprietary management protocol and proprietary parameter and command sets that are not compatible with standards-compliant devices, said at least one port being selected from the group consisting of a serial port, a contact closure port, and an analog port;

at least one terminal interface for connecting to a communication link between said communication interface and a user computer at a remote location being employed to remotely connect and configure said legacy device, said terminal interface being selected from the group consisting of a modem, and a local area network access board, said communication link being part of one of the internet, an intranet and a public switched telephone network, said communication interface being operable to process data for connection and configuration of said legacy device received from said user computer via said at least one terminal interface, said communication interface allowing said legacy device to be remotely connected and configured from said user computer via said communications link for device management using a standards-based network management protocol and manager;

a memory device for storing said data relating to said legacy device and at least by one Management Information-base or MIB file for allowing interpretation m a native protocol corresponding to said legacy device into operations in accordance with said standards-based network management protocol;

an agent for communicating with said manager connected to said communication interface via said terminal interface and one of the internet, an intranet and a public switched telephone network;

a web server connected to said terminal interface for allowing said communication interface to communicate with said user computer using at least one of the internet and the World Wide Web; and a processor connected to said port, said terminal interface, said memory device and said server, said processor being programmable to generate a plurality of pages which can be accessed by said user computer via said server, said pages allowing said user computer to enter said data, said processor being programmable to automatically generate said MIB file for said legacy device to allow said agent to interpret native interface operations of said legacy device as said operations in accordance with said standards-based network management protocol and adapt said legacy device to standards-based device management without software development;

wherein said native interface operations are management protocol, and parameter and command sets unique to said legacy device, wherein a single command can set multiple inter-related parameters in the managed legacy device, wherein a single command can set multiple inter-related parameters in the managed legacy device.

2. A terminal as claimed in claim 1, wherein said pages prompt a user at said user computer to enter data selected from the group consisting of a logical device number for said legacy device, a port number corresponding to said port, a managed device driver for said legacy device selected from a group consisting of a command response driver, a page scraping driver, a menu-based driver and a custom driver, a port driver selected from the group consisting of a null driver, a parallel driver, an asynchronous serial port driver and an intelligent asynchronous serial port driver, at least one of a plurality of port parameters comprising baud rate, parity, number of data bits, and number of stop bits, and options for generating alert messages for transmission to said manager from said port, said data being stored in said memory device.

3. A universal device management terminal for managing a plurality of devices from different vendors using a single standards-based network management protocol and manager, the plurality of network devices comprising standards-compliant, manageable devices, previously unmanageable devices, and non-compliant manageable devices, the terminal comprising:

a plurality of ports for connecting to said plurality of network devices, said plurality of ports being selected from the group consisting of a serial port, a contact closure port, and an analog port;

at least one terminal interface for connecting said manager to said terminal via a communication link, said terminal interface being selected from the group consisting of a modem, and a local area network access board, said communication link being part of at least one of the internet, an intranet and a public switched telephone network;

a memory device for storing configuration data relating to each of said plurality of devices, at least one Management Information Base or MIB file for each of a plurality of classes in which said plurality of devices are classified for allowing interpretation of native interlace operations corresponding to said plurality of devices into manager operations corresponding to said network management protocol;

a processing device programmable to automatically generate said MIB file for each different of said non-compliant manageable devices and said previously unmanageable devices using minimal input of configuration data relating to said non-compliant manageable devices and said previously unmanageable devices and in the absence of software development to adapt said non-compliant manageable devices and said previously unmanageable devices to standards-based network management, said MIB file for a corresponding one of said non-compliant manageable devices and said previously unmanageable devices allowing said agent to interpret native interface operations unique to that device; and an agent for communicating with said manager, said agent being operable to access said memory device and perform a plurality of operations to interpret native interface operations corresponding to each of said plurality of devices as said manager operations, said MIB files stored in said memory device having been created for said standards-compliant manageable devices, said previously unmanageable devices, and said non-compliant manageable devices to assist said agent when interpreting said native interface operations, said agent being programmable to bind a variable in a command from said manager to an instance in one of said MIB files corresponding to one of said plurality of devices specified by said manager, said MIB file comprising said manager operations required for processing said variable in accordance with said command, wherein a single command can set multiple inter-related parameters in the managed legacy device.

4. A terminal as claimed in claim 3, wherein said memory device further comprises a plurality of managed device drivers selected from the group consisting of a command response driver, a page scraping driver, a menu-based driver and a custom driver, said agent being programmable to select one of said instrumentation drivers to convert said manager operations into a sequence of input and output events that are compatible with said device.

5. A terminal as claimed in claim 3, wherein said memory device further comprises a plurality of port drivers selected from the group consisting of a null driver, a parallel driver, an asynchronous serial port drive and an intelligent asynchronous serial port driver, said agent being programmable to execute one of said port drivers corresponding to said port to which said device is connected.

6. A terminal as claimed in claim 3, wherein said MIB files comprise data relating to generation of alert messages by said terminal, said agent being programmable transmit trap messages to said manager when selected events occur with respect to said plurality of devices in accordance with said MIB files.

7. A terminal as claimed in claim 3, wherein said MIB files comprise data relating to generation of alert messages by said terminal, said terminal comprising a facsimile server and being configured to transmit alert messages via said facsimile server to telephone numbers specified in said MIB files when selected events occur with respect to said plurality of devices.

8. A terminal as claimed in claim 3, wherein said MIB files comprise data relating to generation of alert messages by said terminal, said terminal being configured to transmit alert messages via electronic mail to hosts using said server when selected events occur with respect to said plurality of devices in accordance with said MIB files, said MIB files specifying internet protocol addresses for said hosts.

9. A terminal as claimed in claim 3, wherein said MIB files comprise data relating to generation of alert messages by said terminal, said terminal being configured to generate entries in an event log stored in said memory device when selected events occur with respect to said plurality of devices in accordance with said MIB files.

10. A terminal as claimed in claim 3, wherein at least one of said plurality of devices is operable to transmit data corresponding to each of a plurality of selected parameters to said terminal in a single response, and one of said manager operations is a get operation for obtaining said data corresponding to at least one of said plurality of selected parameters from at least one of said plurality of devices, said terminal being operable to maintain a response cache in said memory device for storing said data and to determine whether said response cache comprises the most recent said data before transmitting a command from said manager for another said single response.

11. A terminal as claimed in claim 3, wherein at least one of said plurality of devices is operable to receive data corresponding to each of a plurality of selected parameters from said terminal in a single command, and one of said manager operations is a set operation for transmitting said data corresponding to at least one of said plurality of selected parameters to at least one of said plurality of devices, said terminal being operable to determine when one of said plurality of selected parameters is set by said manager before transmitting a single command to said at least one of said plurality of devices to set each of said plurality of selected parameters.

12. A method of configuring a site server for managing a plurality of devices connected to the site server comprising the steps of:

accessing said site server from a remote computer running a browser application program and connected to said site server via a communication link, said remote computer transmitting a page request and query data to said site server using said browser application program;

downloading at least one page from said site server using said remote computer, said page being accessible from said site server in response to said page request and configured to prompt a user at said remote computer to enter configuration data relating to at least one of said plurality of devices for transmission to said site server; and entering said configuration data on said at least one page to configure said site server to perform device adaptation by communicating with at least one of said plurality of devices and performing at least one operation selected from the group consisting of obtaining selected data from said at least one of said plurality of devices, providing at least one of said plurality of devices with a command for execution, and providing at least one of said plurality of devices with data, wherein a single command can set multiple inter-related parameters in the managed legacy device; and transmitting said configuration data to said site server, said configuration data allowing said user at said remote computer to configure said site server to manage said at least one of said plurality of devices without having to write program code for said site server.

13. A method as claimed in claim 12, wherein said downloading step comprises the step of downloading a page using HyperText Markup Language or HTML.

14. A method as claimed in claim 12, wherein said page request is transmitted using HyperText Transfer Protocol or HTTP.

15. A method as claimed in claim 12, wherein said downloading step comprises the step of downloading a home page corresponding to said site server, said home page providing said user at said remote computer with at least one option selected from the group consisting of browsing a Management Information Base or MIB, viewing an event log generated by said site server, configuring said site server to communicate with at least one of said plurality of devices, and performing administrative operations.

16. A method as claimed in claim 12, wherein said downloading step comprises the step of downloading at least one configuration page to provide said user at said remote computer with at least one option selected from the group consisting of specifying a password which must be entered by said user to perform administrative functions relating to said site server, specifying a password which must be entered by said user before entering said configuration data, specifying a facsimile number to which said site server can send status data relating to at least one of said plurality of devices, specifying at least one of a telephone number and an Internet protocol address for connecting said site server to a network manager, and specifying an Internet protocol address for use by said site server.

17. A method as claimed in claim 12, wherein said site server maintains a Management Information Base and said downloading step comprises the step of downloading at least one configuration page to provide said user at said remote computer with at least one option selected from the group consisting of specifying a device class in which at least one of said plurality of devices is classified, specifying an instrumentation driver for allowing said site server to communicate with said plurality of devices in said device class, and specifying which of a number of ports corresponding to said site server said plurality of devices in said device class are connected.

18. A method as claimed in claim 12, wherein said site server comprises a plurality of ports to which said plurality of devices are connected, a plurality of port drivers and a plurality of instrumentation drivers, and said entering step further comprises the step of selecting at least one of said plurality of instrument drivers and at least one of said port drivers using said browser application program at said remote computer for configuring said site server to manage a selected one of said plurality of devices.

19. A method as claimed in claim 18, further comprising the steps of:
   downloading at least one page from said site server using said remote computer to prompt said user to configure said selected one of said plurality of instrumentation drivers using said browser application program; and
   using said browser application program to specify device parameter data selected from the group consisting of at least one of a device class in which corresponding ones of said plurality of devices are classified, specifying a table in a Management Information Base stored at said site server, specifying an entry in said table for a selected parameter relating to at least one of said plurality of devices in said device class, and specifying by which of read-only and write-only operations said selected parameter is accessible.

20. A method as claimed in claim 19, further comprising the steps of:
   downloading at least one page from said site server using said remote computer to prompt said user to configure a network management command for said selected parameter; and
   entering command data for transmission to said site server, said command data being selected from group consisting of a string of data corresponding to said network management command and formatted in accordance with the native protocol of said plurality of devices in said device class, a duration of time for said site server to wait for a response to said network management command from one of said plurality of devices in said device class, and characteristics of said response.

21. A method as claimed in claim 20, wherein said network management command is one of a simple network management protocol or SNMP Get command and an SNMP Set command.

22. A method as claimed in claim 12, wherein said at least one operation is formatted in accordance with a network management protocol selected from the group consisting of Simple Network Management Protocol or SNMP, Common Management Information Protocol or CMIP, and Telecommunications Management Network or TMN protocol.

23. A method as claimed in claim 12, wherein said site server is configured to be accessed by said remote computer using a plurality of internet protocol addresses, said site server operating as a host for a plurality of internet sites using different ones of said plurality of internet protocol addresses.

24. A method as claimed in claim 12, wherein said site server is configured to operate in accordance with a plurality of internet protocol addresses, and further comprising the steps of:
   assigning one of said plurality of internet protocol addresses to selected ones of said plurality of devices; and
   generating a screen on a network terminal having a plurality of icons corresponding in number to said selected ones of said plurality of devices having one of said plurality of internet protocol addresses assigned thereto.

25. A terminal as claimed in claim 6, wherein said terminal uses Internet Protocol aliasing and said trap messages appear to said manager to come from said plurality of devices and not said terminal.

26. A method for configuring a device to be managed comprising the steps of:
   generating web pages to allow a user to enter configuration data, said configuration data relating to a legacy device that is one of unmanageable, and manageable using a proprietary vendor specific management native interface and protocol, and is not compatible with a standards-based management protocol;
   storing said configuration data in a database at a terminal; and
   interpreting said native interface of said legacy device as at least one standards-based management operation using said configuration data in conjunction with at least one of a plurality of management information base or MIB files in said database in the absence of the user having to write program code, said terminal being configured to allow any device selected from the group consisting of standards-compliant devices and legacy devices to be managed from any manager in either of a standards-based network management system or a proprietary, vendor-specific system, wherein a single command can set multiple inter-related parameters in the managed legacy device.

27. A method as claimed in claim 26, wherein said interpreting step comprises the steps of:
   accessing said database using scripting language for a selected operation of said native interface;
   demand-loading selected drivers stored in said database;
   demand-loading selected said MIB files from said database; and
   binding variables located in said scripting language with instances from the selected said MIB files.

28. A computer program product for device management comprising:
   a computer-readable medium;

a web page generation module stored on the computer-readable medium that generates at least one web page for transmission to a user, said web page comprising prompts for obtaining selected information from said user, said information relating to attributes of a new device to be managed; and a manager configuration module stored on the computer-readable medium operable to modify at least one of a database and a Management Information Base or MIB in accordance with said information to interpret native interface operations of said device in accordance with a standards-based network management protocol and allow said manager configuration module establish initial communication with said device, wherein a single command can set multiple inter-related parameters in the managed legacy device.

29. A computer program product as claimed in claim 28, wherein said web page generation module is operable to generate additional web pages following said initial communication to allow a user to request management functions relating to said device, and said manager configuration module is operable to receive and fulfill said request.

30. A computer program product as claimed in claim 28, wherein said manager configuration module is operable to use said information and said at least one of a database and a MIB to establish said initial communication without requiring said user to provide program code for implementing connection and management functions for said device.

31. A method for providing device management comprising:

receiving a request from a user to connect a new device to a management interface;

generating at least one web page to obtain information relating to said new device from said user;

transmitting said at least one web page to said user;

receiving said at least one web page from said user comprising said information; and modifying at least one of a database and a Management Information Base or MIB in accordance with said information to configure said management interface to communicate with said new device, said at least one web page being operable to allow configuration of said management interface to communicate with said new device without requiring development of program code, wherein a single command can set multiple inter-related parameters in the managed legacy device.

32. A method as claimed in claim 31, wherein said at least one web page employs scripting language, and further comprising binding variables in said scripting language to MIB instances associated with said MIB.

33. A method as claimed in claim 31, wherein said at least one web page is configured to guide said user to enter said information to create at least one of a database table and a MIB table for storage, respectively, in said database and said MIB.

34. A method as claimed in claim 33, wherein said at least one web page is configured to guide said user to enter said information to modify said at least one of a database table and a MIB table.

35. A method as claimed in claim 34, wherein said at least one web page is configured to guide said user to enter said information to modify said at least one of a database table and a MIB table for a selected device class.

* * * * *